(12) United States Patent
Khoshkava et al.

(10) Patent No.: US 10,678,364 B2
(45) Date of Patent: Jun. 9, 2020

(54) SYSTEM FOR PROVIDING SENSOR AND ACTUATION FUNCTIONALITY FOR TOUCH INPUT DEVICE

(71) Applicant: IMMERSION CORPORATION, San Jose, CA (US)

(72) Inventors: Vahid Khoshkava, Montreal (CA); Juan Manuel Cruz-Hernandez, Montreal (CA); Neil T. Olien, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 66 days.

(21) Appl. No.: 15/902,745

(22) Filed: Feb. 22, 2018

(65) Prior Publication Data

US 2018/0275810 A1    Sep. 27, 2018

Related U.S. Application Data

(60) Provisional application No. 62/475,826, filed on Mar. 23, 2017.

(51) Int. Cl.
*G06F 3/041*    (2006.01)
*G06F 3/0488*   (2013.01)
*G06F 3/01*     (2006.01)

(52) U.S. Cl.
CPC ............ *G06F 3/0414* (2013.01); *G06F 3/016* (2013.01); *G06F 3/0488* (2013.01); *B60K 2370/143* (2019.05)

(58) Field of Classification Search
CPC combination set(s) only.
See application file for complete search history.

(56) References Cited

U.S. PATENT DOCUMENTS

2010/0110018 A1* 5/2010 Faubert ............... G06F 1/1626
                                                  345/173
2010/0156814 A1* 6/2010 Weber ................. G06F 3/016
                                                  345/173

(Continued)

FOREIGN PATENT DOCUMENTS

EP    2 184 664 A1    5/2010
EP    3 086 207 A1   10/2016

(Continued)

OTHER PUBLICATIONS

Extended Search Report dated Jul. 27, 2018 in corresponding European Patent Application No. 18 162 209.3.

(Continued)

*Primary Examiner* — Van N Chow
(74) *Attorney, Agent, or Firm* — Medler Ferro Woodhouse & Mills PLLC

(57) ABSTRACT

A touch input system comprising a touch input device and an actuation and sensing system is presented. The actuation and sensing system has a transfer structure adjacent to a first surface of the touch input device, the transfer structure having a first portion and a beam extending from an edge of the first portion. The actuation and sensing system further has a transducer patch disposed on the beam. The transfer structure is configured to transfer forces between the touch input device and the transducer patch, such that movement of the touch input device by an external force causes deformation of the beam and of the transducer patch, and such that actuation output by the transducer patch causes movement of the touch input device. The transducer patch has a layer of transducer material that is configured to act as a sensor, and is configured to act as an actuator.

15 Claims, 19 Drawing Sheets

(56) References Cited

U.S. PATENT DOCUMENTS

| | | | | |
|---|---|---|---|---|
| 2010/0274447 A1* | 10/2010 | Stumpf | ................... | G01D 1/00 |
| | | | | 701/36 |
| 2011/0050406 A1 | 3/2011 | Hennig et al. | | |
| 2016/0313795 A1* | 10/2016 | Muramatsu | ......... | H01L 41/0986 |
| 2017/0202724 A1* | 7/2017 | De Rossi | ................ | A61H 3/00 |

FOREIGN PATENT DOCUMENTS

| | | |
|---|---|---|
| JP | 2010-015514 A | 1/2010 |
| WO | 2016/207751 A1 | 12/2016 |

OTHER PUBLICATIONS

Communication pursuant to Article 94(3) EPC issued in European Application No. 18162209.3, dated Jun. 27, 2019.

* cited by examiner

SYSTEM FOR PROVIDING SENSOR AND ACTUATION FUNCTIONALITY FOR TOUCH INPUT DEVICE

CROSS REFERENCE TO RELATED APPLICATIONS

This application claims priority to U.S. Provisional Application 62/475,826, filed on Mar. 23, 2017, the entire content of which is incorporated herein in its entirety.

FIELD OF THE INVENTION

The present invention is directed to a system that provides a sensor and actuation functionality for a touch input device.

BACKGROUND

Electronic device manufacturers strive to produce a rich interface for users. Many devices use visual and auditory cues to provide feedback to a user. In some interface devices, a kinesthetic effect (such as active and resistive force feedback) and/or a tactile effect (such as vibration, texture, and heat) are also provided to the user. Kinesthetic effects and tactile effects may more generally be referred to as "haptic feedback" or "haptic effects". Haptic feedback can provide cues that enhance and simplify the user interface. For example, vibration effects, or vibrotactile haptic effects, may be useful in providing cues to users of electronic devices to alert the user to specific events, or provide realistic feedback to create greater sensory immersion within an actual, simulated or virtual environment. Such effects may have application in user interfaces, gaming, automotive, consumer electronics and other user interfaces in actual, simulated or virtual environments.

SUMMARY

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

One aspect of the embodiments herein relate to a touch input system comprising a touch input device, and an actuation and sensing system. The touch input device is for receiving a touch input. The actuation and sensing system has a transfer structure disposed adjacent to a first surface of the touch input device, the transfer structure having a first portion and a beam extending from an edge of the first portion. The actuation and sensing system further has a transducer patch disposed on the beam. The transfer structure is configured to transfer forces between the touch input device and the transducer patch, such that movement of the touch input device by an external force exerted by the touch input causes deformation of the beam and of the transducer patch disposed on the beam, and such that actuation output by the transducer patch causes movement of the touch input device. The transducer patch has a layer of transducer material that is configured to act as a sensor by outputting a first electrical signal when the transducer patch and the beam are deformed by the external force, and is configured to act as an actuator by outputting movement that actuates the beam when a second electrical signal is applied to the transducer material.

In an embodiment, the beam is a resilient beam configured as a beam spring, wherein the deformation of the beam in response to the force exerted by the touch input comprises bending of the beam, and wherein the bending of the beam causes bending of the transducer patch.

In an embodiment, the transfer structure is a transfer layer, wherein the touch input device and the transfer layer are both flat and parallel with each other when no touch input has been received at the touch input device.

In an embodiment, the transfer layer is disposed at a rear surface of the touch input device, wherein the rear surface is an opposite surface to an input surface of the touch input device.

In an embodiment, the first portion of the transfer layer is a central portion thereof, and the beam is a first beam extending from a first edge of the central portion. In this embodiment, the transfer layer further comprises a second beam extending from a second and opposite edge of the central portion. The transducer patch is a first transducer patch, and the actuation and sensing system has a second transducer patch disposed on the second beam, the second transducer patch also having a layer of the transducer material. In this embodiment, movement of the touch input device by the external force causes bending movement of at least one of the first beam and of the second beam, which causes bending movement of at least one of the first transducer patch and of the second transducer patch, respectively.

In an embodiment, the touch input system further comprises a spacer layer disposed between the rear surface of the touch input device and both the first beam and the second beam. The touch input system further comprises a rigid mounting support directly attached to the central portion to configure the central portion as a substantially fixed portion of the transfer layer relative to the rigid mounting support, wherein the rigid mounting support is configured to mount the touch input system to a mounting surface.

In an embodiment, the touch input device is curved, and wherein the transfer structure is a first transfer structure, and the beam is a first beam that supports the touch input device at a first edge thereof. In this embodiment, the actuation and sensing system further comprises a second transfer structure having a second beam that supports the touch input device at a second and opposite edge thereof, and having a second transducer patch disposed on the second beam, wherein movement of the touch input device by the external force causes bending of at least one of the first beam and the second beam.

In an embodiment, the touch input system further comprises a rigid mounting support, wherein the first transfer structure extends from the rigid mounting support to the first edge of the touch input device, and the second transfer structure extends from the rigid mounting support to the second edge of the touch input device. In this embodiment, the first portion of the first transfer structure is a first base portion that is connected to the rigid mounting support, and the second transfer structure has a second base portion connected to the rigid mounting support, the second beam extending from an edge of the second base portion.

In an embodiment, each of the first base portion of the first transfer structure and the second base portion of the second transfer structure forms an oblique angle with the rigid mounting support.

In an embodiment, the first beam is one of a first set of beams of the first transfer structure that supports the touch input device at the first edge thereof, and the transducer patch is one of a first set of transducer patches disposed at the respective first set of beams. In this embodiment, the second beam is one of a second set of beams of the second transfer structure that supports the touch input device at the second edge thereof, and the second transducer patch is one of a second set of transducer patches disposed at the respective second set of beams.

In an embodiment, the touch input device has a curved display layer and a curved transparent cover, wherein an outer surface of the transparent cover is an input surface of the touch input device.

In an embodiment, the transducer material includes a macrofiber composite (MFC) material disposed between two electrodes, the MFC material having a plurality of piezoceramic fibers embedded in a polymer matrix, or includes an electroactive polymer (EAP) material or an elastomer material disposed between two electrodes.

In an embodiment, the touch input device comprises an internal capacitive sensor disposed at an input surface of the touch input device.

One aspect of the embodiments herein relates to a touch input system, comprising a touch input device and an actuation and sensing system. The touch input device has an input surface configured to receive a touch input and a rear surface that is an opposite surface to the input surface. The actuation and sensing system has a transfer layer disposed on the rear surface of the touch input device. The transfer layer has a first portion that is a central portion of the transfer layer, and has and a first beam and a second beam, wherein the first beam extends from a first edge of the central portion, and the second beam extends from a second and opposite edge of the central portion. The actuation and sensing system further has a spacer layer, a first transducer patch, and a second transducer patch. The spacer layer is disposed between the rear surface of the touch input device and each beam of the first beam and the second beam. The first transducer patch is disposed on the first beam. The second transducer patch is disposed on the second beam. The transfer layer is configured to transfer forces between the touch input device and both the first transducer patch and the second transducer patch, such that movement of the touch input device by an external force causes deformation of the first and second beams and of the first and second transducer patches, and such that actuation output by the first transducer patch or the second transducer patch causes movement of the touch input device. Each transducer patch of the first transducer patch and the second transducer patch has a layer of transducer material that is configured to act as a sensor by outputting a first electrical signal when the respective transducer patch and the respective beam are deformed by the external force, and is configured to act as an actuator by outputting movement that actuates the respective beam when a second electrical signal is applied to the transducer material.

In an embodiment, the touch input device is a rigid display device, and wherein, when the movement of the display device by the external force is substantially perpendicular to the input surface thereof. In this embodiment, the deformation of each beam of the first and second beams includes a bending movement, which causes a bending movement of the first transducer patch and the second transducer patch, respectively.

In an embodiment, the touch input system further comprises a rigid mounting support directly attached to the central portion to configure the central portion as a substantially fixed portion of the transfer layer relative to the rigid mounting support, and wherein the touch input device is suspended on the first beam and the second beam of the transfer layer.

In an embodiment, the touch input system further comprises a control unit in signal communication with the first transducer patch and the second transducer patch, and configured to receive the first electrical signal from one or more transducer patches of the first transducer patch and the second transducer patch during a first period. The control unit is further configured to detect the movement of the touch input device by the external force based on receiving the first electrical signal. The control unit is further configured to determine that a touch input has been received based on the detection of the movement of the touch input device by the external force, and to determine that a haptic effect is to be generated in response to determining that the touch input has been received. Additionally, the control unit is configured to provide via a signal generator an oscillating drive signal as the second electrical signal to one or more transducer patches of the first transducer patch and the second transducer patch during a second period to cause the haptic effect to be generated at the touch input device.

In an embodiment, the control unit is configured to determine, based on the first electrical signal, a pressure level associated with the touch input or a gesture associated with the touch input.

In an embodiment, when the first electrical signal comprises one or more pulses, the control unit is configured to determine that the touch input is a tapping input.

In an embodiment, the transfer layer comprises at least four beams, which include the first beam and the second beam, and wherein the at least four beams are disposed symmetrically about the central portion of the transfer layer, and wherein the at least four beams are all rectangular in shape, and have the same length, width, and thickness, and wherein the spacer layer has a thickness in a range of 50 μm to 200 μm.

BRIEF DESCRIPTION OF THE DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION

Figure 1A:
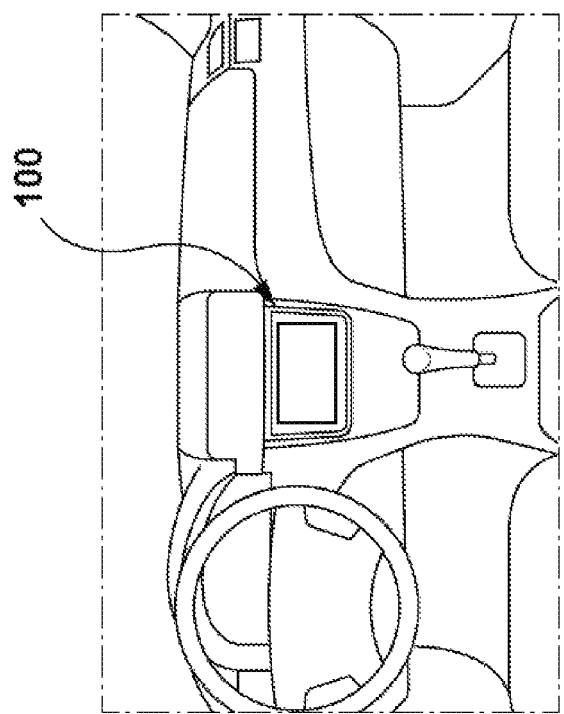
FIGS. 1A and 1B illustrate perspective views of a touch input system, according to an embodiment hereof.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments hereof relate to a touch input system that includes an actuation and sensing system for providing both a haptic actuation functionality and a sensing functionality for a touch input device, such as a device having an input surface for receiving a touch input (e.g., a liquid crystal display (LCD) device having an input surface). In an embodiment, the touch input device and the actuation and sensing system may be part of an in-vehicle user interface system, such as a center console system or a dashboard system of a car or other vehicle. In some instances, the touch input device may include a resistive, capacitive, or other type of touch screen that, e.g., is configured to determine a location of the touch input, a gesture being made by the touch input, or other characteristic of the touch input. In an embodiment, the actuation and sensing system may be configured to sense a click or other touch input being applied to the touch input device, and to generate a vibrotactile effect or other haptic effect at the touch input device.

In an embodiment, the actuation and sensing system may include a transfer structure that both transfers an external force exerted by a touch input from the touch input device to a transducer, and transfers actuation output by the transducer to the touch input device. For instance, the transfer structure may have the form of a layer, which may be referred to as a transfer layer or a transfer sheet. When the touch input device receives an external force, such as from a user, the touch input device may in turn exert a force on a portion of the transfer layer, which may bend or otherwise deform in response. In some cases, the portion of the transfer layer may form a beam that is able to undergo bending or other deformation. The deformation may be an elastic deformation. The transducer mentioned above may have the form of a transducer patch, and may also be attached (also referred to as being connected) to the beam via an adhesive or other manner of attachment. As the beam of the transfer layer bends, it may force the transducer patch to also bend, which may stretch the transducer patch, resulting in strain in the transducer patch. Thus, the transfer layer may transfer the external force from the touch input device to the transducer, and cause strain or other deformation in the transducer. The strain may cause the transducer patch to generate an electrical signal, which may be a sensor signal for detecting the external force from the user. Further, a drive signal may be applied to the transducer patch to cause the transducer patch to deform, vibrate, or to otherwise output actuation. When the transducer outputs actuation, such as a vibration, the transfer layer may transfer the vibration or other movement from the actuation to the touch input device.

In an embodiment, the transfer structure may support a weight of the touch input device. For instance, the transfer structure may form one or more beams that provide a spring suspension on which the touch input device is supported. In such instances, the transfer structure may be referred to as a support structure, and the one or more beams may be referred to as one or more support beams. If the transfer structure in such instances has the form of a transfer layer, the transfer layer may also be referred to as a support layer or support sheet.

In an embodiment, the touch input device may have an input surface that is a front surface of the touch input device, wherein the front surface is a surface that faces a user. A user may apply a touch input by pressing against the input surface via a finger or a stylus. The external force from the touch input may be in a variety of directions relative to the input surface. For instance, it may be perpendicular to the input surface of the touch input device, parallel to the input surface (e.g., by rubbing the input surface, such that the external force is exerted along the input surface), or can be a combination thereof (e.g., oblique to the input surface).

In an embodiment, the touch input device may have a flat input surface. In an embodiment, the touch input device may have a curved input surface, or an input surface that is otherwise non-flat on a macroscopic scale. The curved input surface may have a degree of curvature that, e.g., conforms to a degree of curvature of a vehicle dashboard. When the input surface is curved, an angle between the input surface and the external force may refer to the angle that is formed between a direction of the external force and a plane that is tangent to the input surface at a location thereon at which the external force is applied. The location may, for instance, be a location at which there is direct contact between the input surface and a touch input.

In an embodiment, both the touch input device and the transfer structure of the actuation and sensing system may be flat and parallel with each other. In an embodiment, the actuation and sensing system may include a transfer structure, such as a transfer layer, disposed on the rear surface of the touch input device. When an external force having a component that is perpendicular (or, more generally, substantially perpendicular) to the front surface of the touch input device is applied thereto (e.g., in a downward direction), this component of the external force may be transferred from the touch input device to the transfer structure of the actuation and sensing system on the rear surface, which may facilitate detection of the external force. In an embodiment, the transfer structure may form a suspension structure or other support structure that supports the weight of the touch input device. The support structure may in some cases be a spring support structure or spring suspension structure that is able to exhibit a spring force on the touch input device. In such an embodiment, the actuation and sensing system may be referred to as a support system, or more specifically a spring support system. As stated above, the support structure may include beams that are able to elastically deform. The beams may act as beam springs that form the spring suspension. The beams may extend from, e.g., a central portion of the support structure, wherein the central portion is configured to be directly attached to a rigid mounting support. The central portion may be more rigid than the beams, and thus act as a substantially stiff portion of the support structure that does not deform when an external force is applied to the support structure, or act as a substantially fixed portion relative to the rigid mounting support.

In an embodiment, the actuation and sensing system may include a transfer structure that supports the touch input device at an edge thereof. For instance, the transfer structure may be a support structure having support beams that act as legs for supporting the touch input device, which may be a flat touch input device or may be a curved touch input device. When the touch input device receives an external force, the external force may be transferred to the beams, which may act as beam springs that undergo elastic deformation, such as bending. As stated above, the transfer structure may be a support structure, which may more specifically have the form of a support layer or support sheet, wherein the support beams (also referred to as transfer beams) extend from an edge of a first portion of the support layer. In an embodiment, the first portion may be a central portion of the support layer. In an embodiment, the first portion is not the central portion of the support layer. For instance, the first portion may, e.g., act as a base portion that is directly attached to a mounting support, which may in turn be directly attached to a mounting surface. The base portion may be a substantially stiff portion that does not deform when the external force is transferred to the support layer.

In an embodiment, the actuation and sensing system may include multiple transfer structures (also referred to as support structures). Each of the support structures may include one or more beams that support a weight of the touch input device. In some cases, the one or more beams may be disposed at an edge of the touch input device, wherein the edge includes locations adjacent to a lateral surface (also referred to as a side surface) of the touch input device. For instance, a first transfer structure may have multiple beams directly attached to a first lateral surface of the touch input device, and a second transfer structure may have multiple beams that are directly attached to a second lateral surface (e.g., an opposite lateral surface) of the touch input device. The first transfer structure and the second transfer structure may support the touch input device on a mounting support, or directly on a mounting surface (if the mounting support is omitted).

As discussed above, the actuation and sensing system may provide, in one unit, a combinatory haptic actuator system and sensor system for, e.g., a touch input surface of a display screen. More specifically, the actuation and sensing system may be arranged to provide sensor functionality and haptic actuation functionality through the same component or same set of components, rather than through separate and independent systems. The sensor functionality may sense an external force, such as from a touch input, being applied to the touch surface (e.g., front surface of the touch input device). The haptic actuation functionality may output, e.g., a vibrotactile haptic effect on the touch surface of the touch input device.

The actuation and sensing system of the embodiments herein may use a transducer, which may include an actuator that can also function as a sensor. In an embodiment, the transducer may include, e.g., a piezoelectric actuator having piezoceramic material. The piezoceramic material may be able to both convert mechanical energy to electrical energy, and convert electrical energy to mechanical energy. For instance, the actuator may include a macrofiber composite (MFC) material, which includes a plurality of piezoceramic fibers embedded in an adhesive or other polymer matrix. In an embodiment, the transducer may additionally or alternatively include another material, such as a layer of electroactive polymer (EAP) material.

In an embodiment, the actuation and sensing system may utilize a mechanical configuration that includes one or more leaf springs (also referred to as one or more beam springs, or more generally in this disclosure as one or more beams). The leaf springs may form a suspension that supports a weight of a touch input device and its touch input surface, such as a surface of a display screen, though in an embodiment the weight of the touch input device is supported by another component, and the one or more leaf springs do not have to support the weight of the touch input device. In an embodiment, the leaf springs may be parallel with the touch input device. In an embodiment, the leaf springs may form an oblique angle or right angle with the touch input device. In some cases, the leaf springs may be disposed adjacent to a lateral surface of the touch input device. In an embodiment, the MFC material of the above-mentioned transducer may be bonded to the one or more leaf springs to provide a haptic feedback (also referred to as a haptic effect), such as a vibration feedback in a z-direction (e.g., a direction substantially perpendicular a mechanically grounded body or mounting support) or in a x-direction or y-direction, or in some other direction. The vibration may be transferred from the one or more leaf springs of the transfer structure to the touch input device, so as to output a vibrotactile haptic effect at the touch surface of the device. As mentioned above, the transducer may be used to provide sensing functionality. For instance, if a user applies an external force or pressure on the touch surface, this external force may be transferred by the one or more leaf springs of the transfer structure to the MFC material of the transducer. The external force may deform the MFC material, thus creating strain in the material. The MFC material may convert the mechanical energy that caused the deformation to an electrical signal, which can be further processed as a sensor signal. In one example, the sensor signal may be a first electrical signal that is generated by the MFC material, while a second electrical signal may be applied to the MFC material to cause it to output vibration or other actuation that is transferred by the one or more leaf springs to the touch surface to output a haptic effect there. Thus, the actuation and sensing system is capable of providing both haptic feedback and sensor functionality. In an embodiment, the sensing functionality of the actuation and sensing system may be able to detect not only a presence of a touch input, but also a characteristic of the touch input, such as an amount of force or pressure from the touch input, a direction of the external force from the touch input, a location on the input surface directly touched by the touch input, or some other characteristic.

Figure 1B:
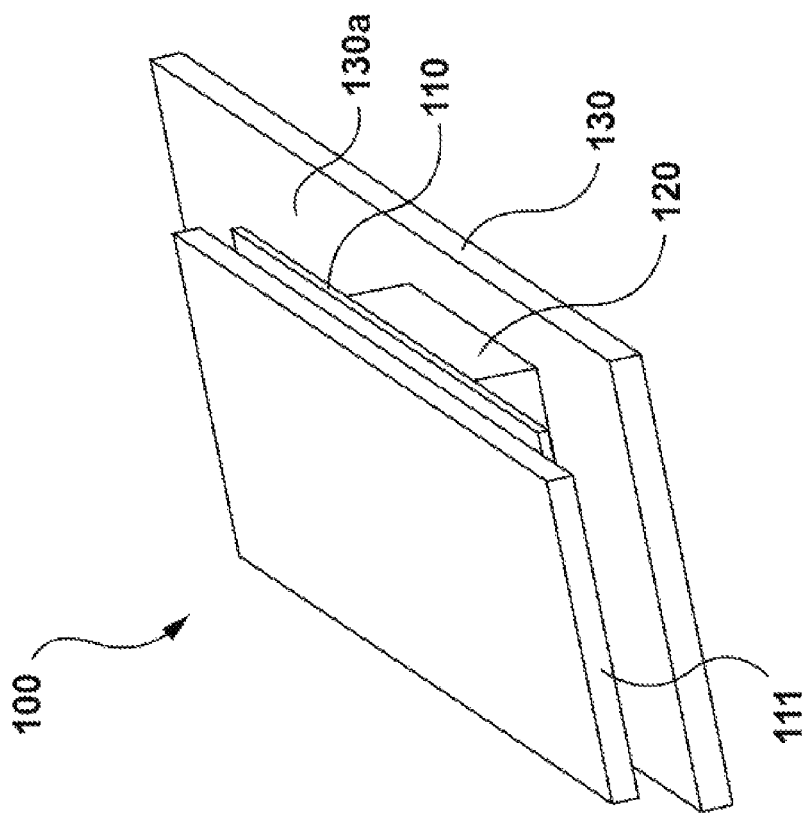

In an embodiment, the actuation and sensing system discussed above may be part of a touch input system 100, as illustrated in FIG. 1A. In an embodiment, the touch input system 100 may be part of an in-vehicle user interface system, such as a central console system and/or vehicle dashboard system used to provide user interaction for various functionality, such as viewing and/or controlling vehicle status, cabin temperature, navigation, radio, calls and text, or other functionality. In an embodiment, as illustrated in FIG. 1B, the touch input system 100 may include a touch input device 111. In an embodiment, the touch input device may provide a conformed input surface. In some cases, the conformed input surface may be curved to conform with a curvature of a dashboard.

Figure 1C:
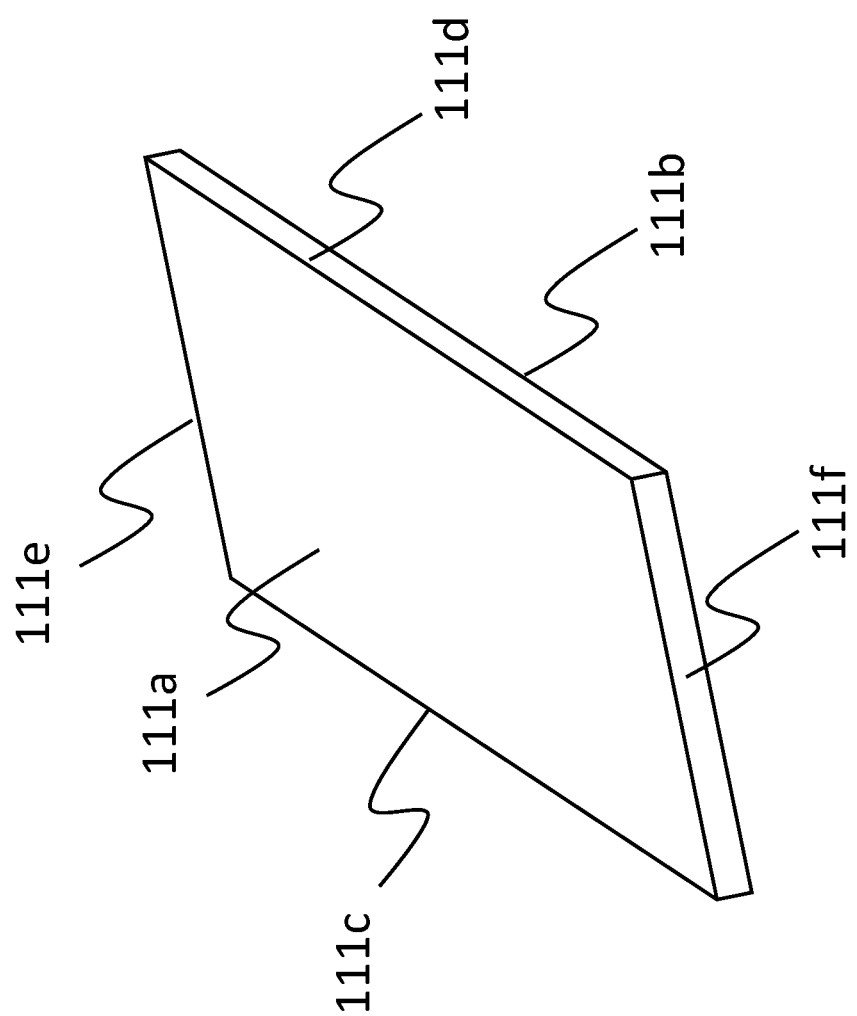
FIG. 1C illustrates a perspective view of a touch input device of the touch input system, according to an embodiment hereof.

As illustrated in FIG. 1C, the touch input device 111 may have an input surface (e.g., a front surface 111*a*) for receiving a touch input, a rear surface 111*b* that is an opposite surface to the input surface (opposite surface to front surface 111*a*). The touch input device 111 may also have lateral surfaces (also referred to as side surfaces) 111*c* to 111*f*, which, in an embodiment, may be surfaces substantially perpendicular to the front surface 111*a*. More generally speaking, the lateral surfaces 111*c* to 111*f* may be surfaces that are not the input surface (e.g., front surface 111*a*) and not the surface that is an opposite surface to the input surface (e.g., not the rear surface). In an embodiment, the lateral surfaces 111*c* to 111*f* may form various edges (e.g., upper edge, lower edge, left edge, and right edge) of a front surface or rear surface of the touch input device. These edges of the front surface or of the rear surface may also be referred to as edges of the touch input device.

As discussed above, in some embodiments of the present disclosure, the actuation and sensing system 110 may act as a supporting system for supporting the touch input device 111. For instance, as illustrated in FIG. 1B, the actuation and sensing system 110 may act as a suspension system that supports a weight of the touch input device 111. In an embodiment, the touch input device 111 may include a display screen, with a front surface 111a of the screen being an input surface. The display screen may have internal touch sensors, such as resistive or capacitive touch sensors disposed near a front surface 111a of the display screen, that configure the display screen as a touch screen, or may have no such internal sensors. In an embodiment, the touch input device 111 may have no display screen or other display functionality, and may function as a touch pad.

In the embodiment illustrated in FIG. 1B, the touch input system 100 may include a mounting support 120 that attaches the touch input device 111 and the actuation and sensing system 110 to a mounting surface 130a of a body 130, such as a body of a dashboard or center console of a vehicle. For instance, the mounting support 120 may be a rigid block that is attached to the actuation and sensing system 110 at one end and attached to the mounting surface 130a at the other end. In an embodiment, the mounting support 120 and the body 130 may together form a mechanically grounded backplane.

As discussed above, the touch input device 111 may be configured to receive a touch input, such as a user pressing on an input surface, such as a front surface 111a of the touch input device 111. The pressing may be part of an input for, e.g., clicking a button displayed on the touch input device 111, or some other user input. As a user presses or otherwise applies an external force on the touch surface of the touch input device 111, the actuation and sensing system 110 may be configured to deform. More specifically, the actuation and sensing system 110 may have a transfer structure that is configured to deform. The transfer structure may transfer the external force to a transducer that causes the transducer to deform, wherein the deformation causes the transducer to generate an electrical signal. The electrical signal may be considered a sensor signal that can be used to detect the touch input. The transducer may also act as an actuator that converts an electrical signal into actuation.

In an embodiment, when a user applies an external force to the touch input device 111, the actuation and sensing system 110 may deform by an amount that is perceptible to a user. In such a scenario, the deformation may be used to simulate, e.g., a mechanical button being depressed as a result of a clicking input. In this scenario, the external force may be in a direction substantially perpendicular to the front surface 111a. The touch input device 111 may, for instance, be rigid, and thus may not be able to completely reproduce by itself the sensation of a button being depressed. The actuation and sensing system 110, however, may be able to undergo deformation by a sufficient amount that is detectable to a user, and thus may be able to assist in reproducing the feeling of a button being pressed. Thus, the actuation and sensing system 110 may complement the touch input device 111 during receipt of a touch input, even if the touch input device 111 already has, e.g., internal capacitive touch sensors that can also detect the touch input.

In an embodiment, as discussed above, the actuation and sensing system may combine actuator functionality and a sensor functionality. The actuator functionality may use, e.g., a piezoceramic actuator such as a macrofiber composite (MFC) actuator, an electroactive polymer (EAP) actuator, any other layer of actuatable material, or any combination thereof. The MFC actuator may provide an advantage of having increased flexibility compared to other types of actuators or actuatable material. The MFC actuator or EAP actuator may further be a transducer that is able to provide sensing functionality for the actuation and sensing system 110.

Figures 2A, 2B:
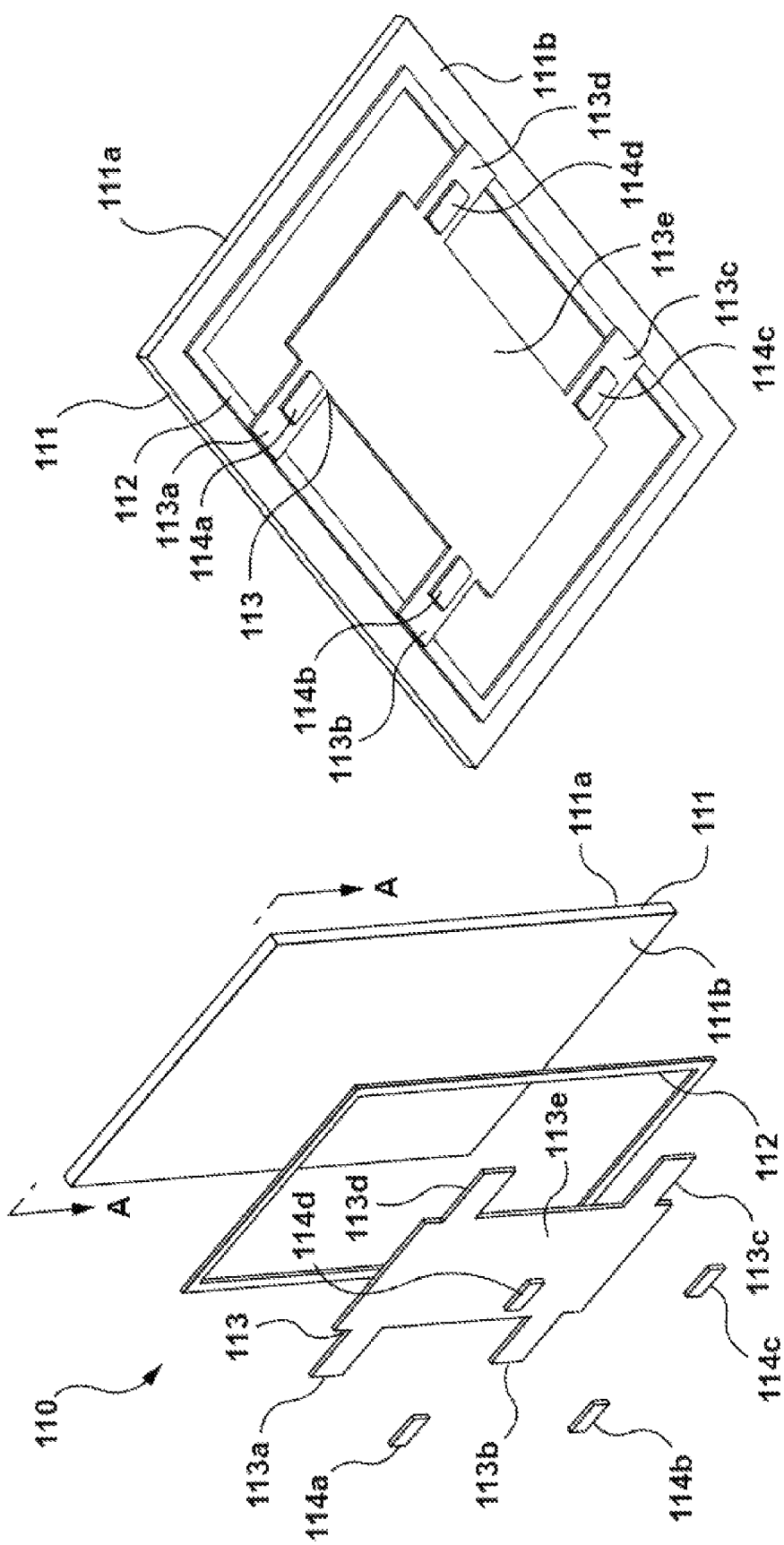
FIG. 2A illustrates an exploded view of a touch input system having a touch input device and an actuation and sensing system, according to an embodiment hereof.
FIG. 2B illustrates a perspective view of a touch input system having a touch input device and an actuation and sensing system, according to an embodiment hereof.

FIGS. 2A and 2B illustrate an actuation and sensing system 110 that includes a transfer structure 113 and a plurality of transducer patches 114a to 114d. The transducer patches 114a to 114d may each have a layer of transducer material that is configured to act as a sensor by outputting a first electrical signal when the respective transducer patch is deformed by an external force, and configured to act as an actuator by outputting movement that actuates the transfer structure 113. The transfer structure 113 may be configured to transfer the external force received by the touch input device 111 to at least one of the transducer patches 114a to 114d, and to transfer actuation output by any of the transducer patches 114a to 114d to the touch input device. In an embodiment, each of the transducer patches 114a to 114d may have a respective pair of electrodes connected to opposite sides of the transducer patch. The pair of electrodes may be in the same plane as the transducer patch. In FIGS. 2A and 2B, the transfer structure 113 has the form of a layer, and thus may also be referred to as a transfer layer 113. The transfer layer 113 may form a plurality of beams 113a to 113d that act as beam springs. These beam springs may also be referred to as leaf springs. Thus, in FIGS. 2A and 2B, the beam springs 113a to 113d may also be referred to as leaf springs 113a to 113d. The transducer patches 114a to 114d may be bonded to, mounted, or otherwise disposed on the leaf springs 113a to 113d, respectively. As stated above, the transducer patches 114a to 114d may be used to output actuation that generates a haptic effect. Thus, in FIGS. 2A to 2B, the transducer patches 114a to 114d may also be referred to as actuator patches 114a to 114d.

While the transfer layer 113 in FIGS. 2A and 2B illustrate four leaf springs 113a-113d, other embodiments may have fewer leaf springs (e.g., two leaf springs) or more leaf springs (e.g, six or more leaf springs), depending on how strong of a haptic effect is needed or desired. In this embodiment, movement of the touch input device by an external force exerted by the touch input may cause deformation of one or more of the leaf springs 113a-113d. Each of the leaf springs 113a to 113d may act as an arm portion that supports part of the weight of touch input device 111, and that deforms (e.g., bends) when an external force from a touch input is applied to the touch input device 111. In an embodiment, the transfer layer 113 may be formed as a sheet of metal, and the leaf springs 113a to 113d may be formed through a metal stamping process, by any other machining technique (e.g., lathing, milling, mechanical or laser cutting), by any other technique, or any combination thereof. In an embodiment, the transfer layer 113 may include a glass sheet. In an embodiment, the leaf springs may be made of one material (e.g., plastic), and may be bonded to a more rigid material (e.g., glass or metal). In an embodiment, the leaf springs 113a to 113d are all rectangular beams, and have the same length, width, and thickness. In another embodiment, the beams 113a to 113d may have different respective shapes and/or different dimensions.

In FIGS. 2A and 2B, the transfer layer 113 may include a first portion 113e from which the leaf springs 113a to 113d extend. More specifically, the leaf springs 113a to 113d may extend from an edge of the first portion 113e. The first portion 113e may be a portion of the transfer layer 113 that is intended to be attached to a mounting surface 130a (e.g., via mounting support 120). In an embodiment, the first portion 113e may be a substantially inflexible or otherwise stiff portion of the transfer layer 113, wherein the first portion 113e does not deform when an external force is applied to the transfer layer 113. For instance, the leaf springs 113a to 113d may have dimensions (e.g., length and/or width) that allow them to be deformed by a certain range of forces or pressures expected for a user input, but the first portion 113e of the transfer layer 113 may be sufficiently stiff such that all or almost all of the first portion 113e is considered mechanically grounded against such a range of forces or pressures. In other words, when an external force from a touch input is applied to the touch input device, the leaf springs 113a to 113d may deform, but most or all of the first portion 113e (even portions thereof that are not directly above mounting support 120) may be considered to be undeformed. Further, once the first portion 113e is attached to the mounting surface 130a via the mounting support 120, the first portion 113e may become mechanically grounded by the mounting support 120 of FIG. 1B, and may then be referred to as a substantially fixed portion 113e, a stationary portion 113e, or a mechanically grounded portion 113e.

In an embodiment, the first portion 113e and the leaf springs 113a-113d of the transfer layer 113 may be made of the same material and be formed in the same step (e.g., via metal stamping), such that they are an integral part of the same material. In an embodiment, the first portion 113e and the leaf springs 113a to 113d may be formed separately. For instance, the first portion 113e may be formed from a first material (e.g., from metal or glass), and the leaf springs 113a to 113d may be formed from a second material (e.g., plastic or silicon) and then attached to the first portion 113e.

In an embodiment, each leaf spring of the leaf springs 113a-113d may be considered to be a mono-leaf spring formed from a resilient beam, which may also be referred to as a beam spring. The beam spring may be able to undergo elastic deformation, such as bending. In an embodiment, the leaf springs 113a to 113d may extend from an edge(s) of the first portion 113e, as discussed above. As discussed above, the leaf springs 113a to 113d may be referred to as beams 113a to 113d in some situations. In an embodiment, the transfer layer 113 may have an even number of beams (e.g., 4, 6, or 8) that are disposed symmetrically about the first portion 113e of the transfer layer 113. In an embodiment, each of the beams 113a to 113d may have a rectangular shape.

Further with respect to the actuator functionality of the actuation and sensing system 110, one factor in the design of the leaf springs 113a to 113d may include designing a stiffness and/or resonant frequency. For instance, the leaf springs 113a to 113d may be designed to have low stiffness and thus be soft. Soft leaf springs may make the touch input device 111 (e.g., LCD screen or OLED screen) mounted on the leaf springs 113a to 113d feel soft upon a user's touch. The soft leaf springs 113a to 113d may further have a low resonant frequency (i.e., natural frequency). The desired stiffness of the leaf springs 113a to 113d should be selected in a way that satisfies the overall stiffness of the touch input system 100 and provides a reasonable range of resonant frequencies. For example, the stiffness of the leaf springs 113a to 113d may be designed in a way such that their natural frequency is in a range of 100 Hz to 250 Hz. The natural frequency or resonant frequency may refer to a frequency at which the leaf springs 113a to 113d vibrate with an out-of-plane movement (e.g., along a z-axis in FIGS. 2A and 2B, or otherwise perpendicular to the plane of the leaf springs).

In an embodiment, each of the transducer patches 114a-114d may have a layer of transducer material, such as piezoelectric material or EAP material, that is configured to act as a sensor by outputting a first electrical signal when the transducer path is deformed, and that is configured to act as an actuator by outputting movement that actuates a corresponding leaf spring 113a-113d when a second electrical signal is applied to the transducer material. For instance, the transducer material may expand or contract in response to being applied with electrical energy. The expansion or contraction of a particular transducer patch may be in a direction parallel with a plane of the transducer patch (e.g., along its length or width), or may be in a direction perpendicular to the plane of the transducer patch (e.g., along its thickness). For instance, the transducer material of transducer patch 114a may expand or contract along its length or width. If the transducer patch 114a is bonded to leaf spring 113a, the expansion or contraction of the transducer patch 114a may force the leaf spring 113a to bend and create an out-of-plane movement (e.g., out-of-plane deformation). If the transducer patch 114a alternates between expansion and contraction, such as from an oscillating drive signal (e.g., a 100 Hz signal), the alternating expansion and contraction of the transducer patch may cause the leaf spring 113a to alternate between bending in one direction and bending in an opposite direction. The resulting movement of the leaf spring 113a may create a vibration that propagates to a front surface of the touch input device 111 to create a haptic effect thereon. The oscillating drive signal may be simultaneously applied to all of the leaf springs 113a-113d, or to only a subset of the leaf springs 113a-113d.

In an embodiment, the sensory functionality also utilizes the leaf spring 113a to 113d, which provides a structure that allows an external force from a mechanical input to be transferred as mechanical work on the transducer patches 114a to 114d and create a deformation in the transducer patches 114a to 114d. The transducer patches 114a-114d may convert the mechanical input to an electrical output to be used later as a sensor information. In an embodiment, a control unit (e.g., signal processing and interface circuit) may process the sensor information of the electrical output to obtain more information about the nature of the interaction of a user with the LCD screen or other touch input device. For instance, the signal processing and interface circuit may figure out if the user is tapping on the LCD screen, pressing the LCD screen, applying different levels of pressure to the LCD screen, making a sweeping gesture through or across a front surface of the LCD screen, or any combination thereof. While the above discussion refers to transducer patches that can convert mechanical input to an electrical output to provide sensing functionality, another embodiment may use actuators that have no such sensing functionality, and merely convert output movement in response to an electrical or other form of energy input.

Referring back to FIGS. 2A and 2B, the figures more generally illustrate the actuation and sensing system 110 disposed adjacent to a surface of the touch input device 111 (e.g., a rear surface 111b of the touch input device 111). In this embodiment, the touch input device 110 is mounted on the actuation and sensing system 110, as illustrated in FIGS. 2A and 2B. In an embodiment, the transfer layer 113 and the touch input device 111 are both flat and substantially parallel with each other. More specifically, the transfer layer 113 may be substantially parallel with a rear surface 111b of the touch input device when no touch input or other external force is being applied to the touch input device.

As mentioned above, the touch input device 111 may have a front surface 111a configured to receive a touch input, and a rear surface 111b. The front surface 111a and the rear surface 111b may be opposite surfaces. The front surface 111a may be a touch input surface. If the touch input device 111 is a display screen, the front surface 111a may be the surface through which images are displayed, or more generally may be a surface that faces a user.

In an embodiment, the actuation and sensing system 110 includes a spacer layer 112, the transfer layer 113, and the plurality of transducer patches 114a to 114d. In FIGS. 2A and 2B, the transfer layer 113 may be disposed on the rear surface 111a of the touch input device 111. As stated above, the transfer layer 113a-113d may include the first portion 113e and four leaf springs 113a-113d, extending from edges of the first portion 113e. In an embodiment, the first leaf spring 113a and the third leaf spring 113b may extend from a first edge (e.g., left edge) of the first portion 113e, and the second leaf spring 113d and the fourth leaf spring 113c may extend from a second and opposite edge (e.g., right edge) of the first portion 113e.

In FIGS. 2A and 2B, the leaf springs 113a-113d may also be referred to as beams 113a-113d. In an embodiment, each beam of beams 113a-113d may be a resilient beam that is able to be deformed from a first position (e.g., original position) by an external force, and to return to automatically return to the first position after the external force is removed. For instance, the resilient beam may be a spring element, or more specifically a beam spring. In an embodiment, the first portion 113e may be a central portion of the transfer layer 113. In an embodiment, the transfer layer 113 may have fewer than four beams (e.g., only a single beam, or only two beams) or more beams (e.g., six beams). In an embodiment, the transfer layer 113 may be centered with respect to an adjacent surface (e.g., rear surface 111b) of the touch input device. In another embodiment, the transfer layer 113 may be off-center with respect to an adjacent surface (e.g., 111b) of the touch input device.

FIGS. 2A and 2B further depict the spacer layer 112 being disposed between the rear surface 111b of the touch input device 111 and each of the beams 113a to 113d (which may act as leaf springs). In an embodiment, the spacer layer 112 may be disposed directly between the rear surface 111b of the touch input device 111 and each of the beams 113a to 113d, and not directly between the rear surface 111b and the first portion (e.g., central portion) 113e of the transfer layer 113, so that the touch input device 111 can be pressed into contact with the first portion 113e of the transfer layer 113. In an embodiment, the spacer layer 112 may be made from a plastic film, such as a polyimide film (e.g., Kapton®). In an embodiment, the spacer layer 112 may be formed as a continuous strip of tape configured in, e.g., a ring structure, as depicted in FIGS. 2A and 2B. In another embodiment, the spacer layer 112 may comprise, e.g., separate and discrete spacers that separate the rear surface 111b of the touch input device 111 from respective beams (e.g., 113a to 113d). In an embodiment, the spacer layer has the spacer layer has a thickness in a range of 50 μm to 200 μm. The spacer layer 112 may be compressible or substantially incompressible.

Further in FIGS. 2A and 2B, the transducer patches 114a-114d include a first transducer patch 114a disposed on a rear surface of the first beam 113a, a second transducer patch 114d disposed on a rear surface of the second beam 113d, a third transducer patch 114b disposed on a rear surface of the third beam 113b, and a fourth transducer patch 114c disposed on a rear surface of the fourth beam 113d. The rear surface of the beams may be a surface that faces away from the touch input device 111. Each of the transducer patches 114a to 114d may have a layer of transducer material that is configured to act as a sensor by outputting a first electrical signal when the transducer patch and its respective beam are deformed by an external force, and is also configured to act as an actuator by outputting movement that actuates the respective beam when a second electrical signal is applied to the transducer material. In an embodiment, the transducer material includes a macrofiber composite (MFC) material disposed between two electrodes. The MFC material may have a plurality of piezoceramic fibers embedded in a polymer matrix. In an embodiment, the transducer material includes an electroactive polymer (EAP) or an elastomer material.

Figure 3:
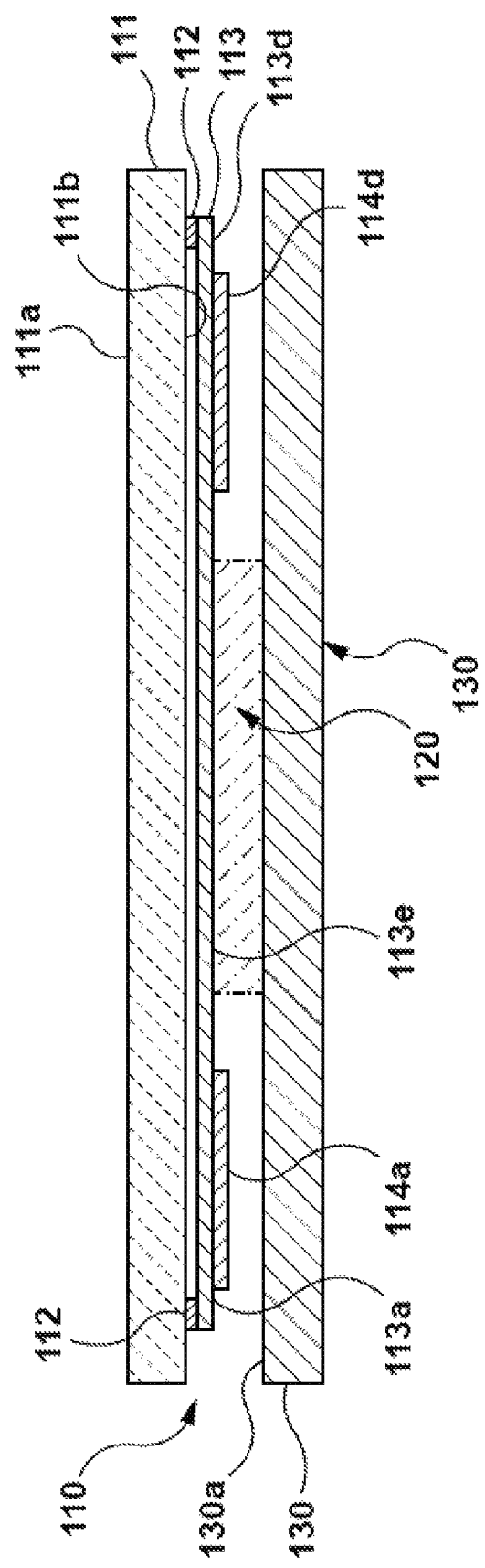
FIGS. 3-5 illustrate sectional views of a touch input device being supported by an actuation and sensing system, according to embodiments hereof.
Figure 4:
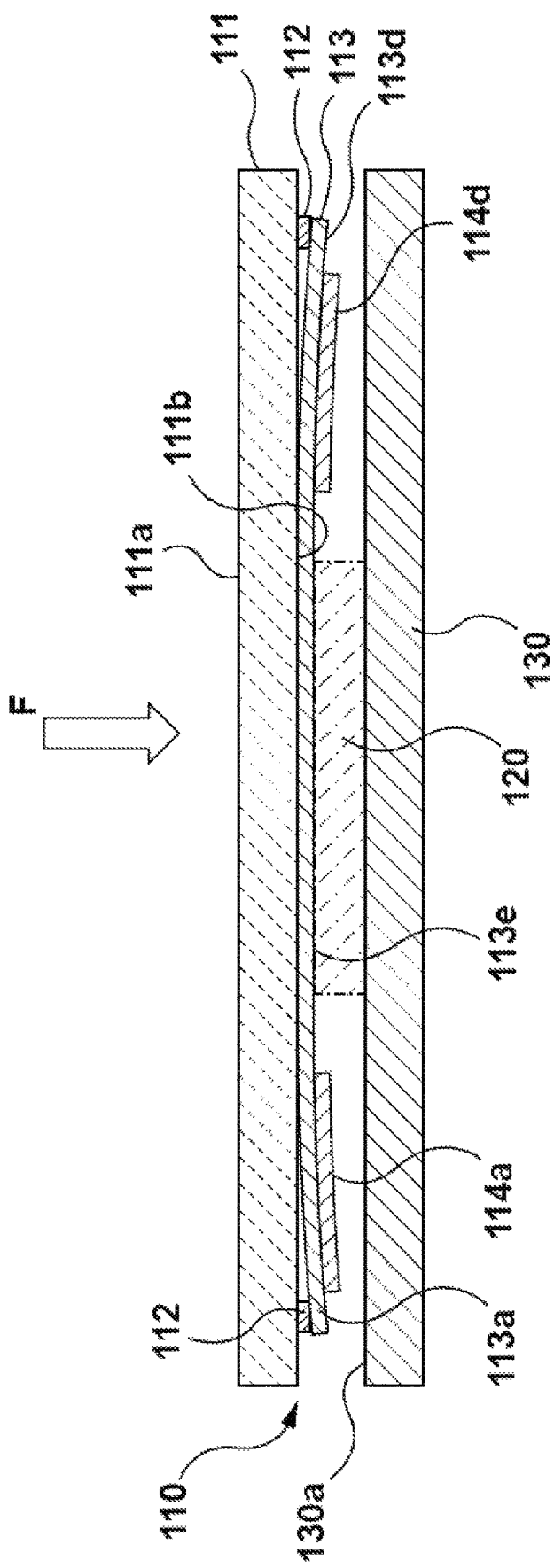

As illustrated in FIGS. 3 and 4, movement of the touch input device 111 by an external force may cause deformation of the beams 113a to 113d and of the actuator patches 114a to 114d. FIGS. 3 and 4 depict a sectional view of the touch input system 100, as viewed in the direction of the arrows A in FIG. 2A. FIGS. 3 and 4 illustrate the touch input device 111 being supported by the first beam 113a and the second beam 113d (each of which may act as a leaf spring), which extend from opposite edges of a first portion 113e of the transfer layer 113. In FIGS. 3 and 4, the first portion 113e may be mounted on or otherwise attached to the mounting support 120, which may be attached to the mounting surface 130a of a body 130. The figures further depict a first actuator patch 114a being disposed on a rear surface 111b (or, more generally speaking, a surface facing away from the touch input device 111) of the first beam 113a, and a second actuator patch 114d being disposed on a rear surface of the second beam 113d.

FIG. 3 represents a scenario in which the touch input device 111 has not yet been pressed, and FIG. 4 represents a situation in which the touch input device 111 is being pressed by an external force F. In the embodiment illustrated in FIG. 4, the external force F presses the touch input device 111 in a direction that is perpendicular or otherwise substantially perpendicular to a front surface 111a thereof. In other embodiments, the external force F may be applied in a different direction, such as a direction that is oblique (or even parallel) to the front surface 111a of the touch input device 111.

In an embodiment, the touch input device 111 may have a rigid housing, such as a housing formed from metal and/or glass, so that the external force F mostly moves the touch input device 111 in the same direction as the force F, rather than simply deform the touch input device 111. As FIGS. 3 and 4 illustrate, the spacer layer 112 may cause the touch input device 111 to be supported by the beams (e.g., 113a and 113d) of the transfer layer 113, or more generally transfer a force directly to the beams. That is, because the spacer layer 112 creates a space between the rear surface 111b of the touch input device 111 and the first portion 113e of the transfer layer 113, the first portion 113e generally does not directly support the weight of the touch input device 111. Rather, because the spacer layer 112 contacts the beams (e.g., 113a and 113d), the weight of the touch input device is supported by the beams 113a-113d. Thus, the external force F in FIG. 4 may be transferred from the touch input device 111 (which may have a rigid structure) to the beams 113a-113d. Further, in an embodiment, the mounting support 120 is also a rigid structure that acts as a mechanical ground, substantially preventing the first portion 113e from moving in the direction of the force F. As a result, the beams (e.g., 113a and 113d) undergo a deformation in the form of a bending movement relative to the first portion 113e of the transfer layer 113. The spacer may prevent the external force from being transferred, at least initially, to the first portion 113e of the transfer layer. As a result, the external force may deform one or more of the beams 113a-113d relative to the first portion 113e.

In an embodiment, the amount of movement of the touch input device 111 and the amount of bending of the beams (e.g., 111a) may be limited by a thickness of the spacer layer 112. The thickness of the spacer layer 112 may, e.g., be in a range of 50 μm to 200 μm. In an embodiment, the thickness of the spacer layer 112 may be substantially equal to a distance between a rear surface 111b of the touch input device 111 and a front surface of the transfer layer 113 (i.e., a surface of the transfer layer 113 that faces the touch input device 111). After the external force F has moved the touch input device 111 by this distance, the touch input device may come into contact against the first portion 113e, which is mechanically grounded by the rigid mounting support 120. The first portion 113e and the mounting support 120 may thus prevent further movement of the touch input device 111 and prevent further bending of the beams (e.g., 113a and 113d) in the direction of the external force F.

In an embodiment, deformation of the beams (e.g., 113a and 113d) causes the transducer patches disposed thereon to also deform. For instance, if the beams 113a and 113d are bent by the external force F, the respective transducer patches 114a and 114d may also be bent, as depicted in FIG. 4. The respective transducer patches 114a and 114d may each generate an electrical signal from the deformation. A respective pair of electrodes may be disposed on opposite sides (e.g., left side and right side) of each of the transducer patches 114a-114d to conduct the electrical signal to a control unit. The electrical signal may be represented as, e.g., a voltage difference between the two electrodes. In an embodiment, the beams (and their respective transducer patches) may deform by the same amount. This may occur, for instance, when the external force F is applied at a center of the touch surface (e.g., front surface 111a) of the touch input device. Such a force may be equally distributed to, e.g., the four beams 113a to 113d of FIGS. 2A and 2B. In an embodiment, the beams (and their respective transducer patches) may deform by different amounts. This may occur, for instance, if the external force F were not applied precisely at the center of the touch surface, but is instead applied closer to a particular surface or corner of the touch surface. Such an external force may be unequally distributed across, e.g., the four beams 113a to 113d of FIGS. 2A and 2B. In an embodiment, a control unit may determine a location on the touch surface at which an external force F is applied (e.g., from a touch input) based on the amounts of deformation in respective beams, and based on a determination of how the external force F is distributed across the beams. By determining the location at which the external force F is applied, the control unit may also be able to track movement of a touch input to, e.g., detect a swiping gesture or any other gesture on the touch surface.

Figure 5:
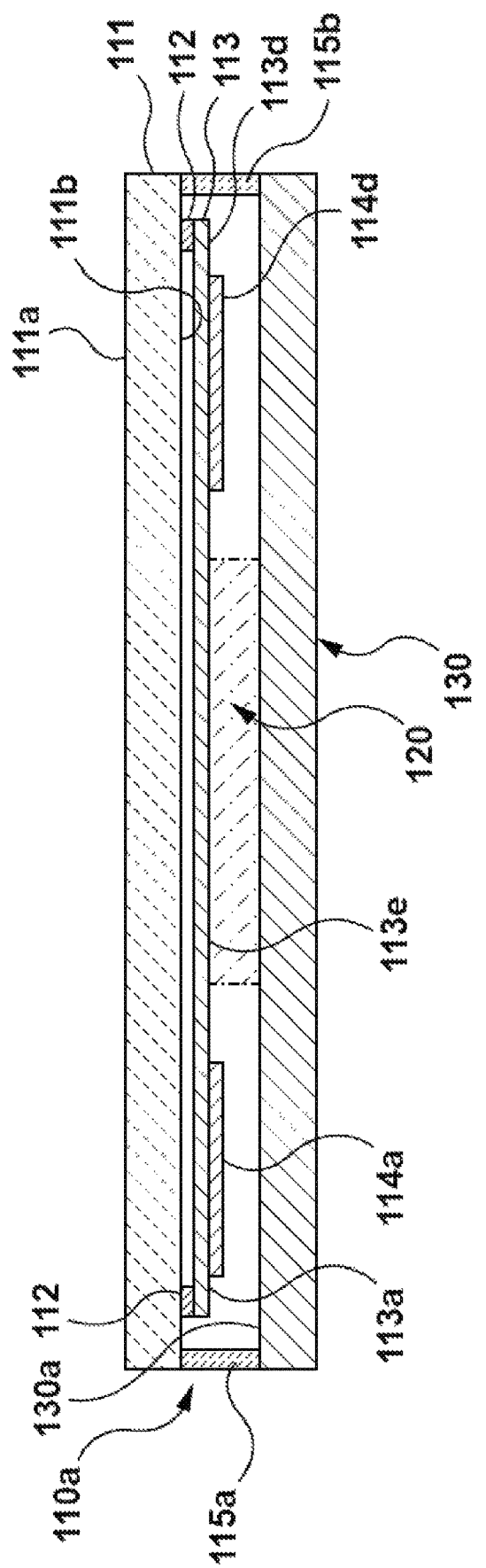

FIG. 5 illustrates another embodiment of a touch input system that has an actuation and sensing system 110a. Like in FIGS. 3 and 4, the actuation and sensing system 110a includes a first beam 113a, a second beam 113b, a spacer layer 112, a first transducer patch 114a, and a second transducer patch 114b. The actuation and sensing system 110a further includes a first compression spring 115a and a second compression spring 115b, which may be designed to tune a resonant frequency of the overall actuation and sensing system 110a. The first compression spring 115a may be disposed between a first edge (e.g., left edge) of the touch input device 111 and the mounting surface 130a. The second compression spring 115b may be disposed between a second, opposite edge (e.g., right edge) of the touch input device and the mounting surface 130a.

Figure 6:
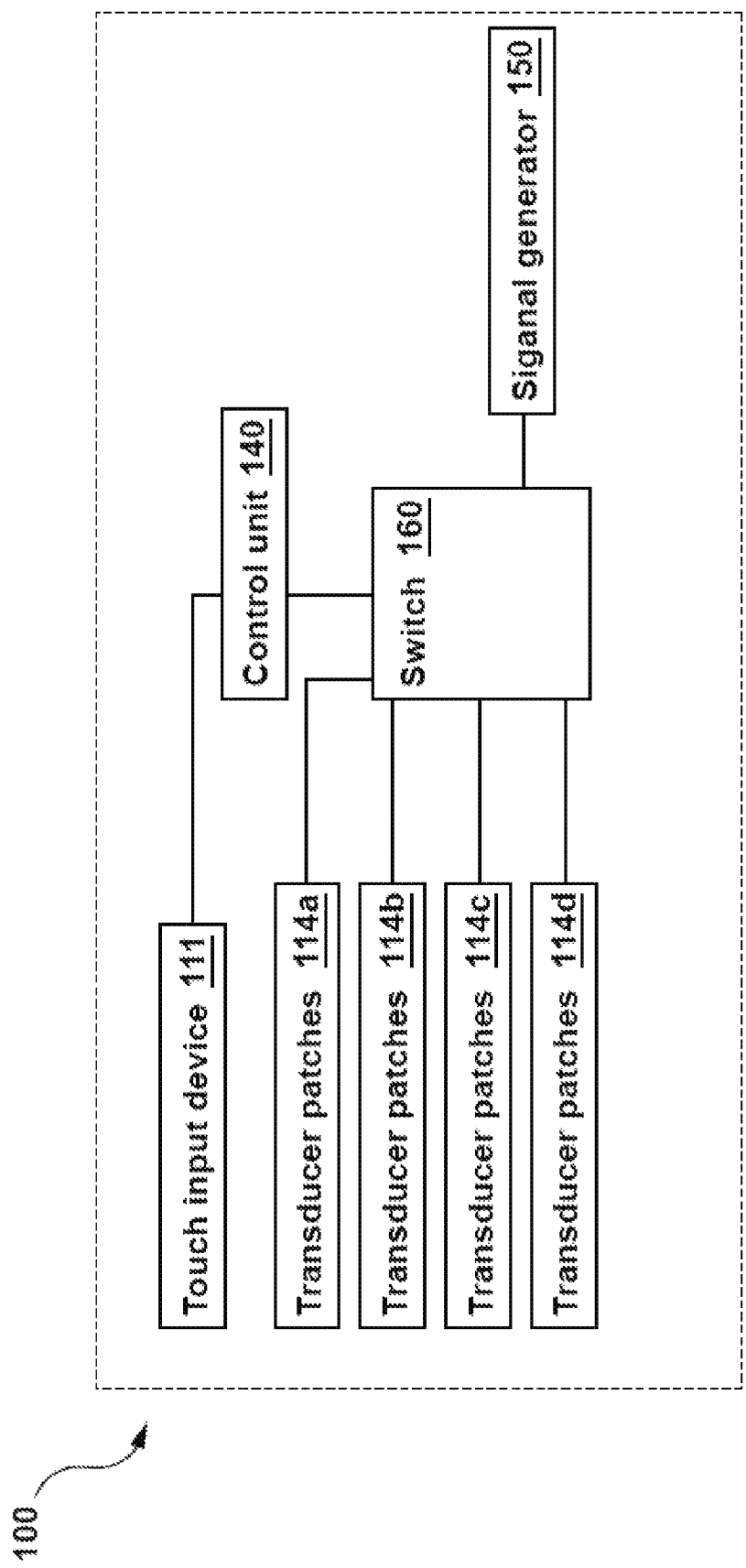
FIG. 6 illustrates a block diagram of various components of a touch input system, according to an embodiment hereof.

FIG. 6 illustrates a block diagram of the touch input system depicted in FIGS. 2A and 2B. The block diagram includes the touch input device 111, the transducer patches 114a to 114d, a control unit 140, a signal generator 150, and a switch 160. The control unit 140 may be in signal communication with the transducer patches 114a-114d through the switch 160. More specifically, it may be in signal communication with electrodes that are in contact with the transducer patches 114a-114d. In an embodiment, the switch 160 may be configured to switch the touch input system 100 between a sensing mode and an actuation mode. In the sensing mode, the switch 160 may be configured to route an electrical signal from one or more of the transducer patches 114a to 114d to the control unit 140. In an embodiment, the switch 160 may electrically disconnect the transducer patches 114a to 114d from the signal generator 150 during the sensing mode. Although the signal generator 150 is depicted in FIG. 6 as being separate from the control unit 140, the signal generator 150 may in some embodiments be part of the control unit 140. In the actuation mode, the switch 160 may electrically connect the signal generator 150 to one or more of the transducer patches 114a-114d. In an embodiment, the control unit 140 may be implemented with a microprocessor, a field programmable gate array (FPGA), any other computing circuit, or any combination thereof.

In an embodiment, the control unit in the sensing mode may be configured to receive a first electrical signal (e.g., voltage signal or current signal) from one or more transducer patches during a first period, and to detect the movement of the touch input device by the external force based on receiving the first electrical signal. The control unit may further be configured to determine that a touch input has been received based on the detection of the movement of the display device by the external force. In an embodiment, the control unit may be configured to determine that a touch input has been received if it receives an electrical signal with an amplitude that is equal to or greater than a defined threshold from one or more of the transducer patches 114a-114d. In an embodiment, the first period may be a sensing period. The sensing period may include, e.g., all time periods outside of a period(s) in which the control unit has determined to output a haptic effect (i.e., outside of an actuation period). In an embodiment, the control unit 140 may be configured to determine one or more characteristics of the touch input based on the first electrical signal. The one or more characteristics may include, e.g., a pressure level associated with the touch input, a location of the touch input, whether the touch input is a tapping input, and/or a gesture (e.g., swiping gesture) associated with the touch input. In an embodiment, when the first electrical signal comprises one or more pulses, the control unit may be configured to determine that the touch input is a tapping input. In this embodiment, each pulse may correspond to a different tap of the tapping input.

In an embodiment, the control unit 140 in the actuation mode may provide a second electrical signal to one or more transducer patches during a second period (e.g., an actuation period) in response to a determination to generate a haptic effect. For instance, the second electrical signal may be applied to as a differential signal to the pair of electrodes in contact with a particular transducer patch. In an embodiment, the control unit 140 may be configured to cause the signal generator 150 to output, as the second electrical signal, an oscillating drive signal, such as a sinusoidal signal, at a resonant frequency of one or more of the beams (e.g., 113a and/or 113d). In an embodiment, each beam has a resonant frequency that is in a range of 100 Hz to 250 Hz. The same oscillating drive signal may be provided to all of the beams (e.g., 113a to 113d), or to only a subset of the beams (e.g., to only beam 113a).

Figure 7:
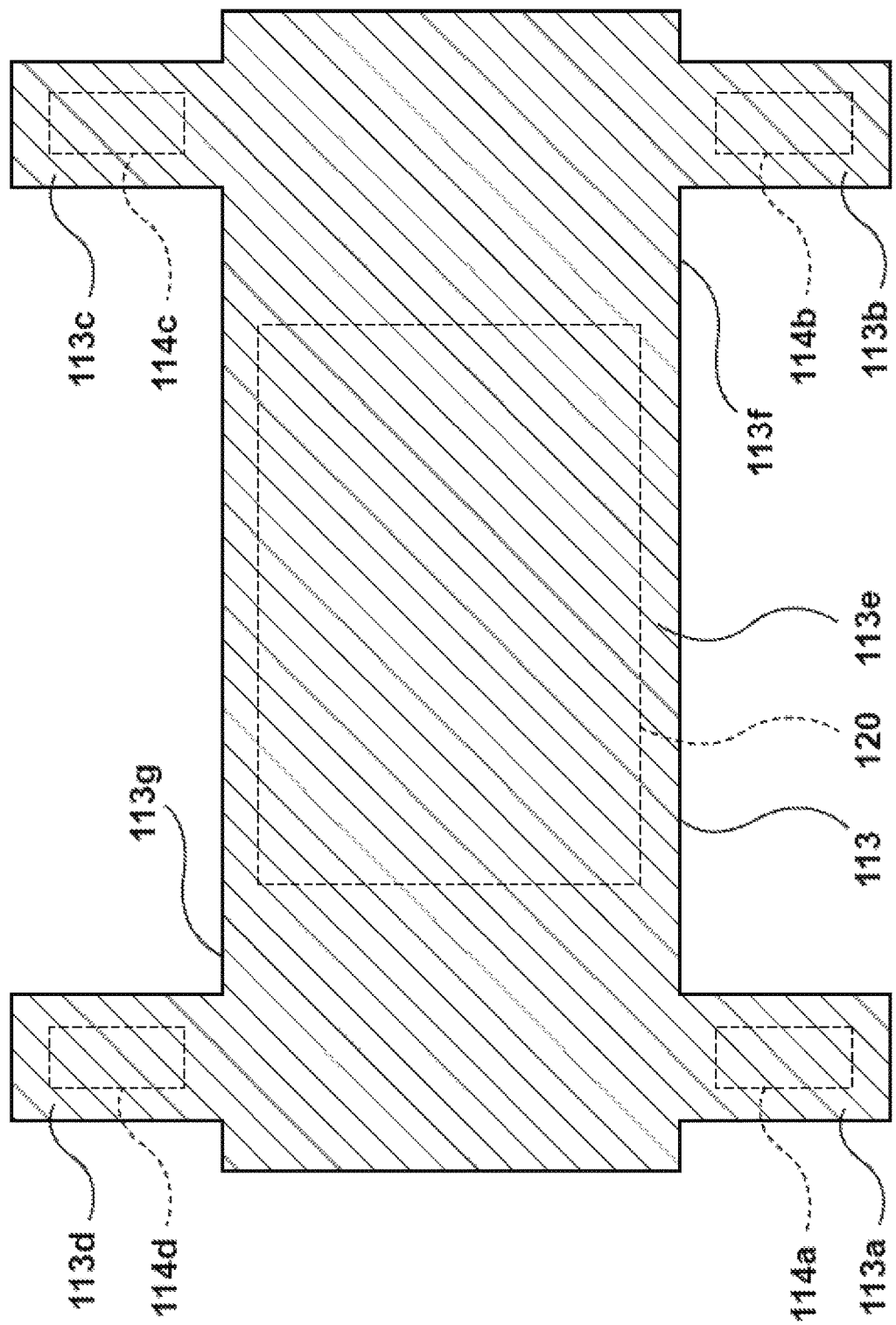
FIGS. 7-11 illustrate plan views of various transfer layers of respective actuation and sensing systems, according to embodiments hereof.

FIGS. 7-12 illustrate top views of various structures or layouts for a transfer layer that forms part of an actuation and sensing system. FIG. 7 depicts a top view of the transfer layer shown in FIGS. 2A and 2B. The figure shows the transfer layer 113 having a first portion 113e mounted on or otherwise attached to a mounting support 120, and having four beams 113a to 113d extending from the first portion 113e. The four beams 113a to 113d may be symmetrically disposed around the first portion 113e, such that two of the beams extend from a first edge 113f (e.g., left edge) of the first portion 113e, and the other two beams extend from a second and opposite edge 113g (e.g., right edge) of the first portion 113e. FIG. 7 further shows the four transducer patches 114a to 114d being disposed on the respective beams 113a to 113d.

Figure 8:
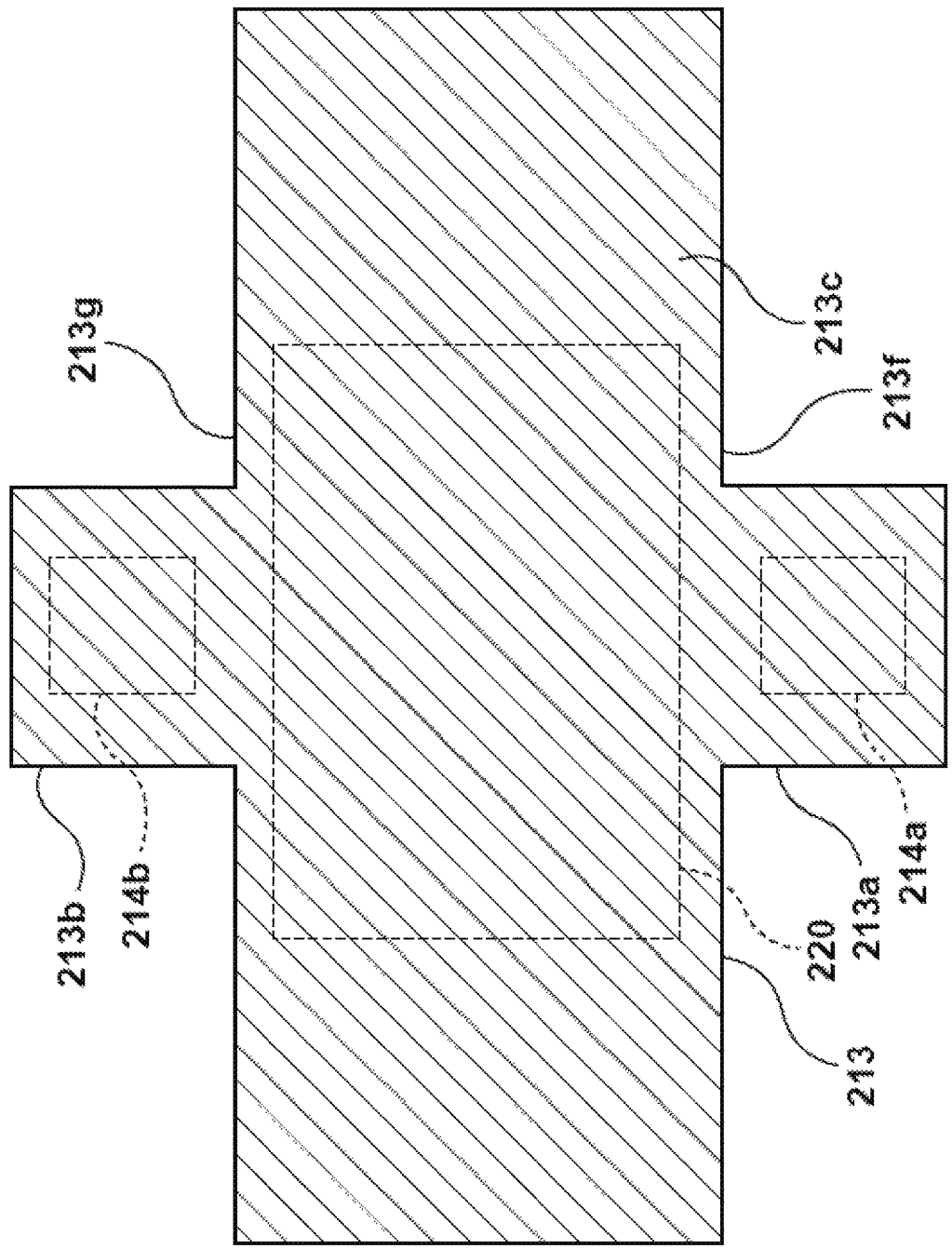

FIG. 8 illustrates a transfer layer 213 having only a first beam 213a and a second beam 213b. The two beams 213a, 213b extend from respective opposite edges 213f, 213g of a first portion 213c of the transfer layer 213. The first portion 213 may be mounted on or otherwise attached to a mounting support 220. FIG. 8 further depicts a first transducer patch 214 and a second transducer patch 214b being disposed on the first beam 213a and the second beam 213b, respectively. The transfer layer 213 in FIG. 8 may be disposed adjacent to a surface, such as a lateral surface or rear surface, of a touch input device.

Figure 9:
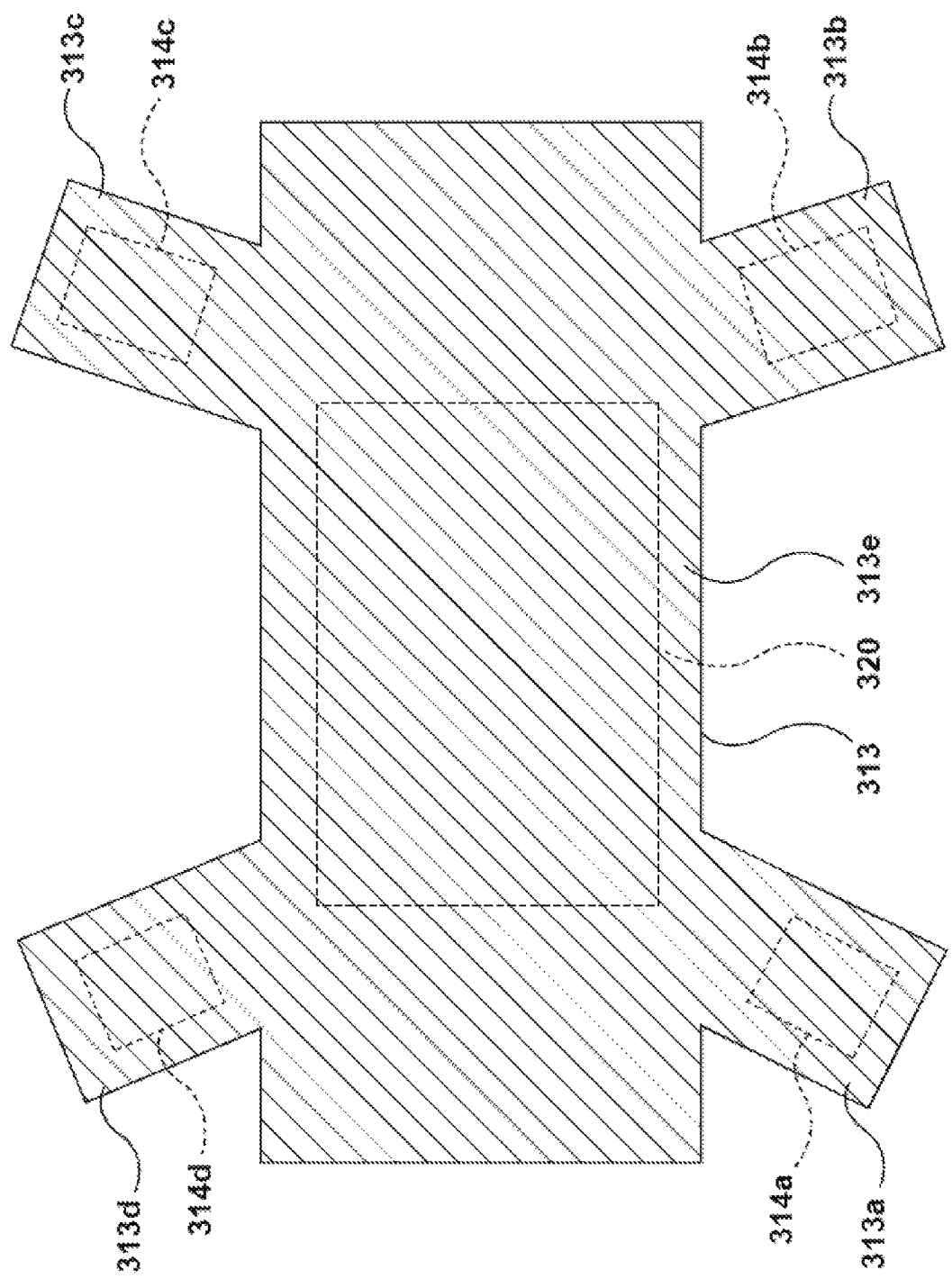

FIG. 9 illustrates a transfer layer 313 having four beams 313a to 313d that extend from a first portion 313e of the transfer layer 313. The first portion 313e may be mounted on a mounting support 320. As illustrated in FIG. 9, each of the beams 313a to 313d may extend from the first portion 313e in a direction that is oblique thereto. When one of the beams 313a to 313d is pressed in, e.g., a downward direction or swiped with a sideways motion, the beams 313a to 313d may experience both a bending force and a twisting force (i.e., both a bending component and a torsion component). In an embodiment, the angle at which the beams 313a to 313d extend obliquely from the first portion 313e may be designed to tune a stiffness of the beams 313a to 313d with respect to how they will deform when an external force is applied on them. As further illustrated in FIG. 9, a plurality of transducer patches 314a to 314d are disposed on respective ones of the beams 313a to 313d. The transfer layer 313 in FIG. 9 may be disposed adjacent to a surface, such as a lateral surface or rear surface, of a touch input device.

Figure 10:
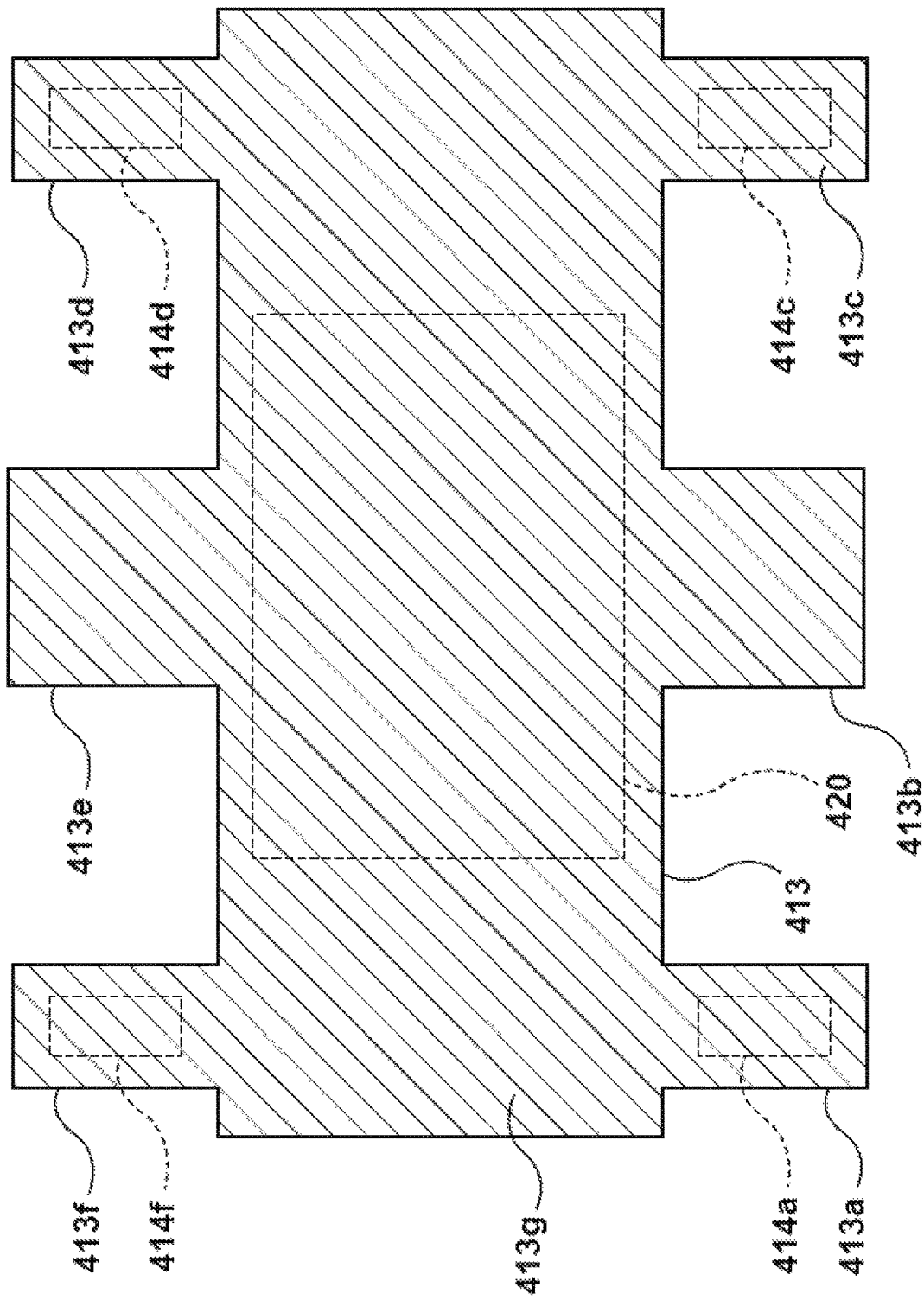

FIG. 10 illustrates a transfer layer 413 that has six beams 413a to 413f extending from a first portion 413g of the transfer layer 413. The first portion 413g may be mounted on a mounting support 420. In FIG. 10, four transducer patches 414a to 414d are disposed on respective ones of only a subset of the six beams 413a to 413f. In other words, no transducer patch is disposed on the beam 413b, nor the beam 413e in the embodiment of FIG. 10. The transfer layer 413 in FIG. 10 may be disposed adjacent to a surface, such as a lateral surface or rear surface, of a touch input device.

Figure 11:
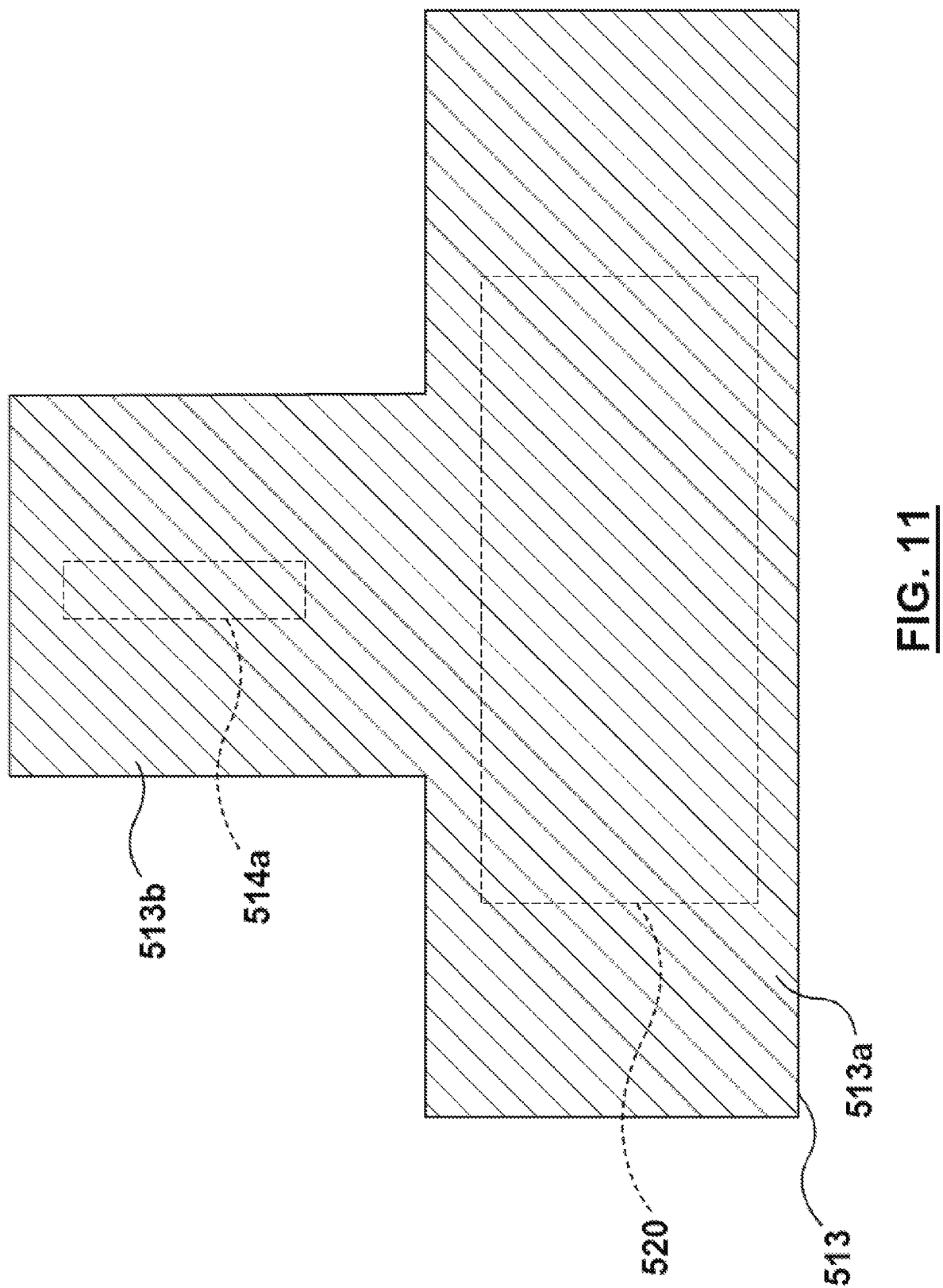

While some of the above embodiments involve a transfer layer having at least two beams extending from opposite edges of the transfer layer, another embodiment of the present disclosure may involve a transfer layer 513 having only one beam 513b, as illustrated in FIG. 11. More specifically, the transfer layer 513 in FIG. 11 may have a first portion 513a that is itself attached to a mounting support 520. The transfer layer 513 may further have a single beam 513b extending from an edge of the substantially fixed portion 513a. A transducer patch 514a may be disposed on the beam 513b. The transfer layer 513 in FIG. 11 may be disposed adjacent to a surface, such as a lateral surface or rear surface, of a touch input device. For instance, a touch input device, such as a LCD screen, may be mounted on the beam 513b of the transfer layer 513. In another example, the touch input device may have a lateral surface that is disposed adjacent to the transfer layer 513. In an embodiment, a spacer layer may be disposed between the beam 513b and the touch input device. In an embodiment, the spacer layer is not disposed between the first portion 513a and the touch input device, so as to leave a gap or distance therebetween. When a user presses on the touch input device, the touch input device may be pressed in, e.g., a downward direction or sideways direction. This movement may cause the gap or distance between the touch input device and the first portion 513 a to decrease, and also cause the beam 513b and the transducer patch 514a to bend.

Figure 12:
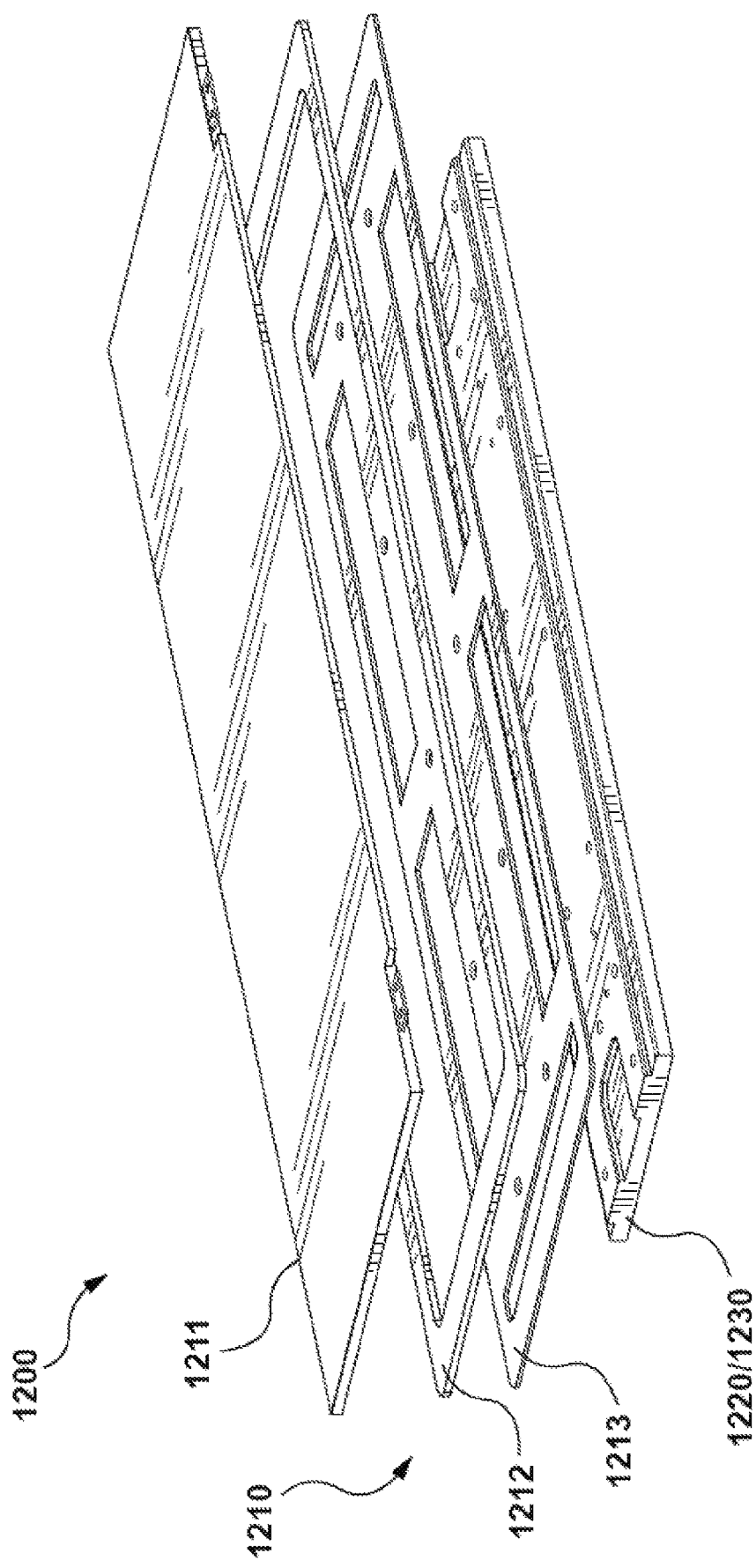
FIGS. 12-15 illustrate views of a touch input system, according to embodiments hereof.
Figure 13:
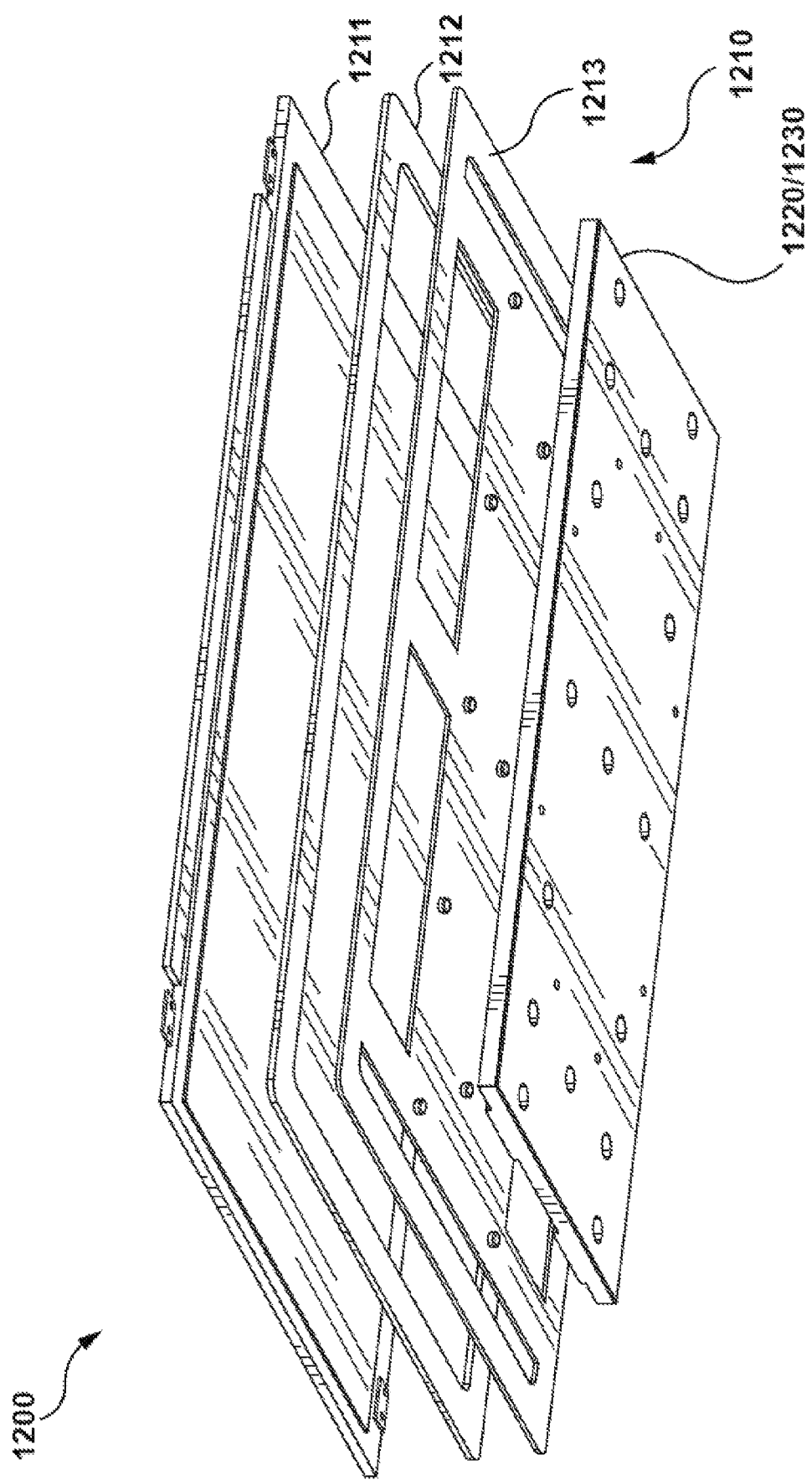
Figure 14:
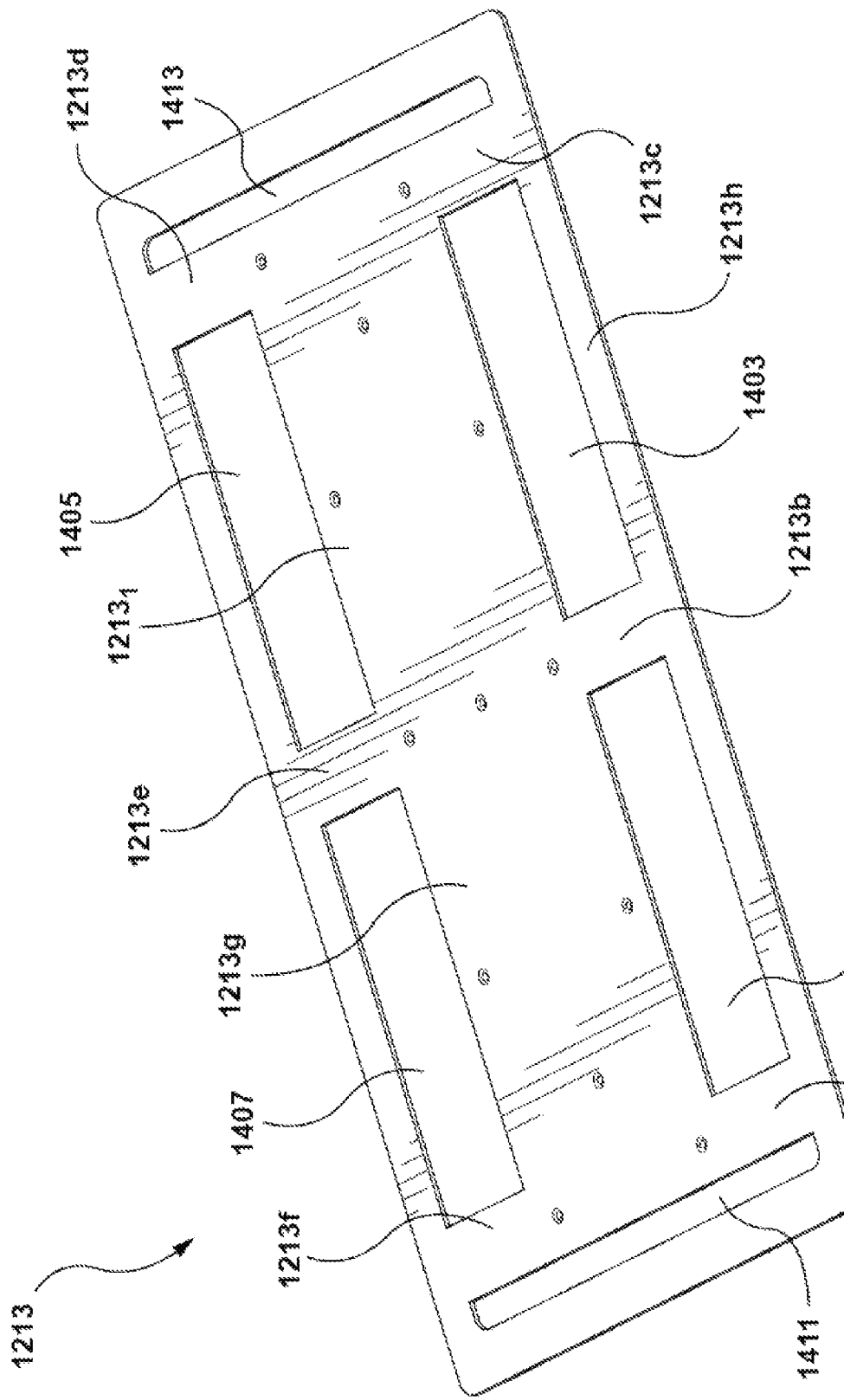

FIGS. 12-15 illustrate views of a touch input system 1200 that includes a LCD device 1211 and an actuation and sensing system 1210. As depicted in FIGS. 12-14, the actuation and sensing system 1210 includes a spacer layer 1212, a leaf spring layer 1213 (which may also be referred to as a beam spring layer 1213, or more generally a transfer layer 1213), and six leaf springs 1213a to 1213f The touch input system 1200 further includes a mounting support structure 1220/1230 to which the actuation and sensing system 1210 is attached. The mounting support structure 1220/1230 may provide a mechanically grounded structure. In an embodiment, the mounting support structure 1220/1230 may be directly attached to a mounting surface, such as a surface in a vehicle compartment for installing the touch input system 1200.

FIG. 14 provides a view of a first surface $1213_1$ of the leaf spring layer 1213. This surface may be a surface facing the LCD device 1211, and may be the surface that contacts the spacer layer 1212. In FIG. 14, the leaf spring layer 1213 includes six beams 1213a to 1213f that extend from one of the edges of a first portion 1213g. The first portion 1213g may be, e.g., a central portion of the leaf spring layer 1213. The first portion 1213g may be a mechanically grounded portion (also referred to as a substantially fixed portion) of the leaf spring layer 1213. As further depicted in the figure, each of the beams 1213a to 1213f may be attached to a frame 1213h that forms a complete or partial perimeter around the first portion 1213g. The beams 1213a-1213f may be separated by gaps 1401-1407. Further, a gap 1411 and another gap 1413 may separate the frame 1213h from some of the beams.

Figure 15:
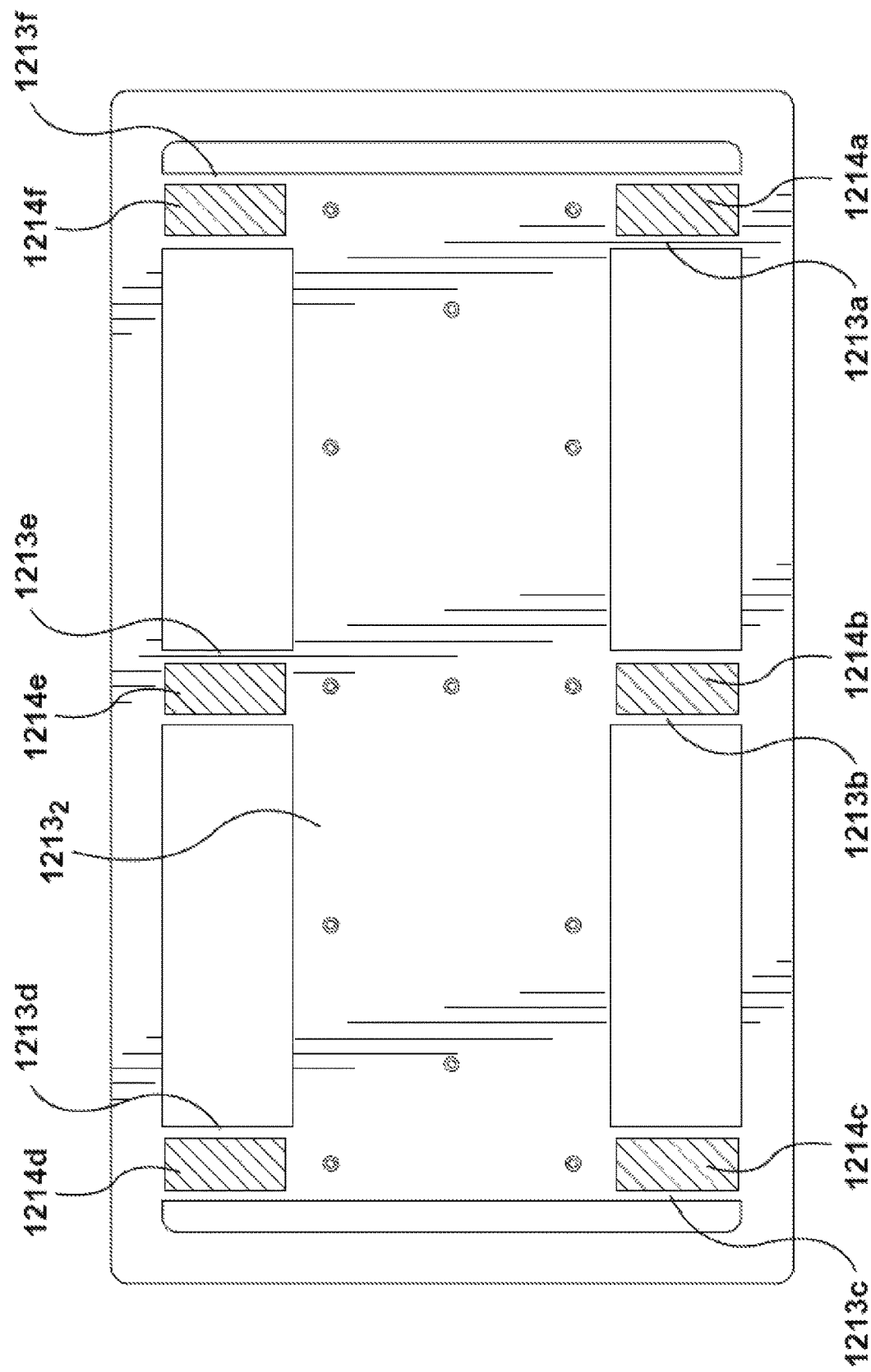

FIG. 15 depicts a second surface $1213_2$ that is an opposite surface to the 1213i. As the figure illustrates, a plurality of MFC actuators 1214a to 1214f may be disposed on respective beams of the plurality of beams 1213a to 1213f. Each of the MFC actuators may be a transducer able to convert mechanical energy to electrical energy, and vice versa.

Figure 16:
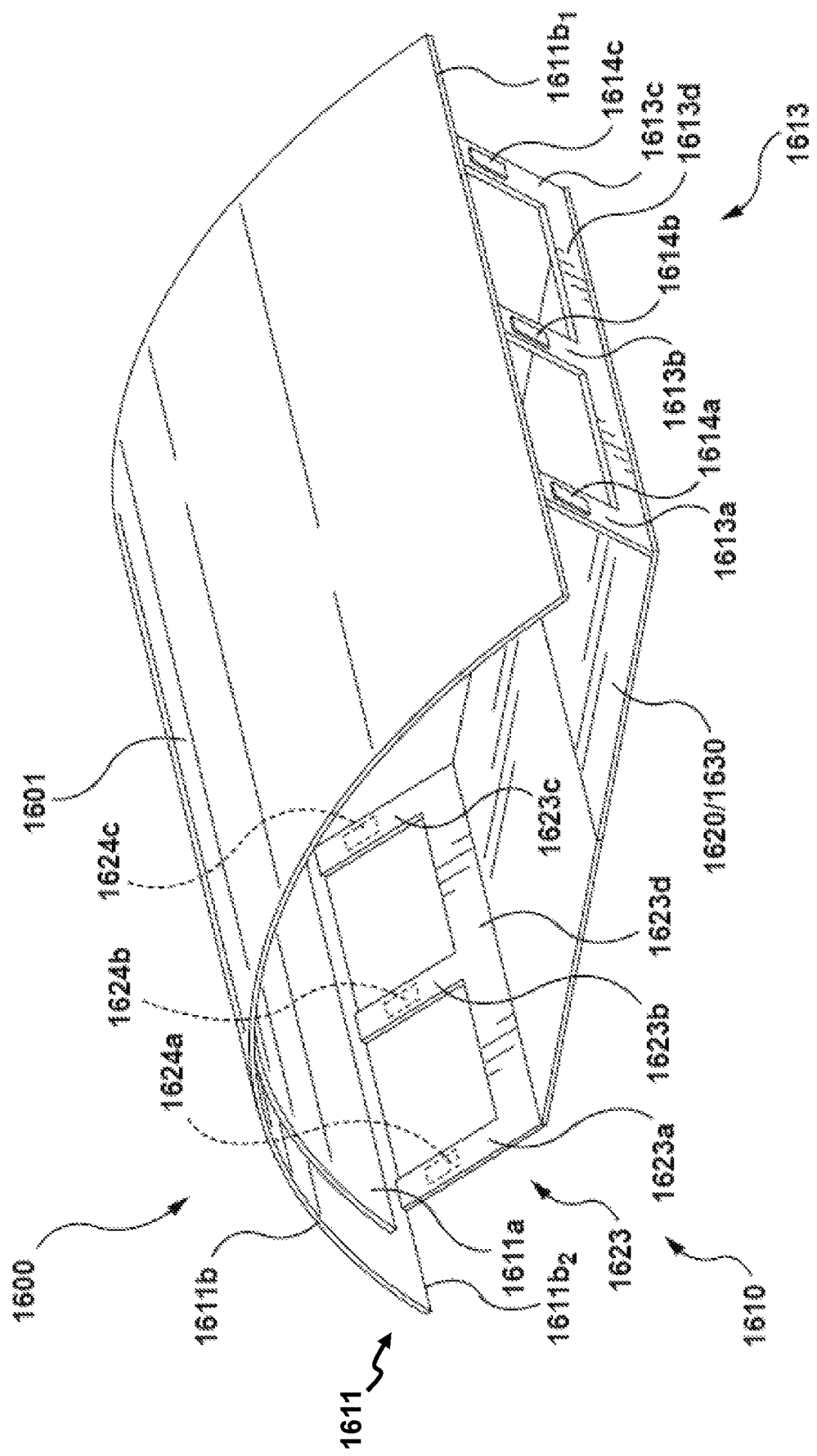
FIGS. 16-18 illustrate views of a touch input system, according to embodiments hereof.
Figure 17:
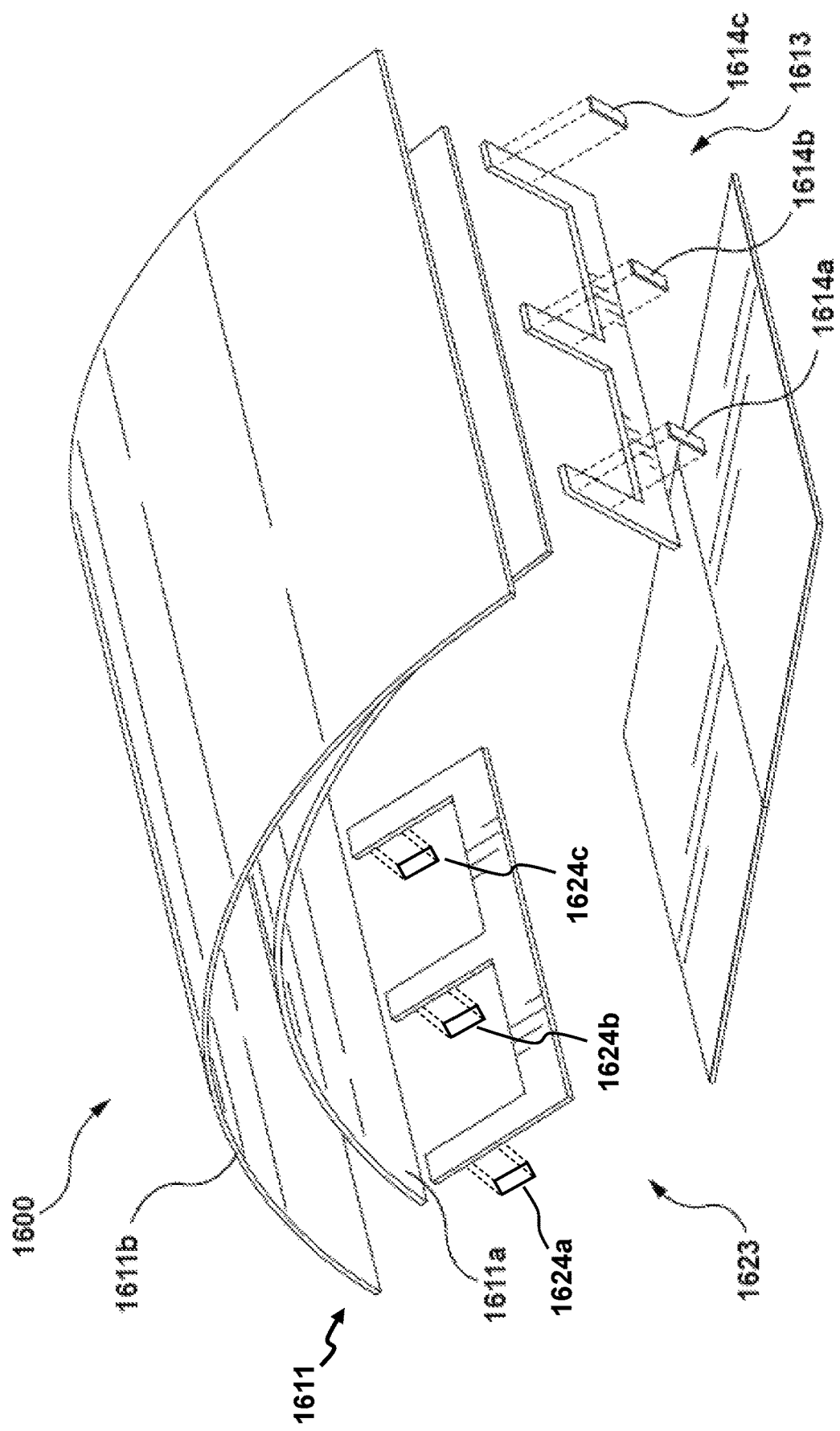
Figure 18:
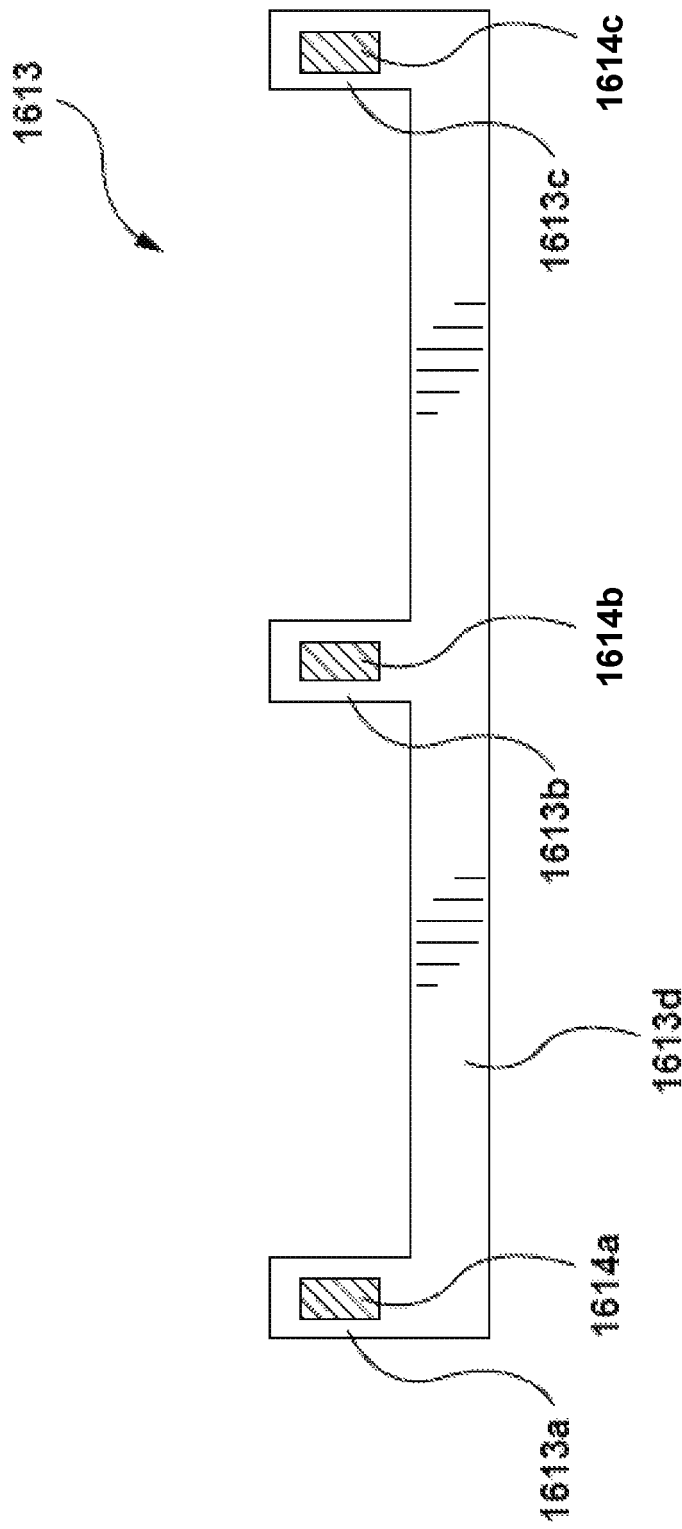

FIGS. 16-18 illustrate an embodiment of a touch input system 1600 having a touch input device 1611 and an actuation and sensing system 1610 that includes a first transfer structure 1613 and a second transfer structure 1623. In an embodiment, each of the first transfer structure 1613 and the second transfer structure 1623 may be formed from, e.g., a sheet of metal or other material, and may thus be referred to as a transfer sheet or transfer layer. Each of the transfer structures 1613, 1623 may further have a beam, which may be referred to as a support beam, that acts as a leg for supporting a portion of the weight of a touch input device 1611.

In an embodiment, the touch input device 1611 is a curved display device is curved, and has a curved display layer (e.g., organic light emitting diode, OLED or liquid crystal display, or LCD layer) 1611a and a curved cover layer (e.g., a glass cover or plastic cover) 1611b. In an embodiment, the touch input device 1611 may have an input surface 1601 that is a top surface of the cover layer 1611b. The top surface may more generally be a front surface of the cover layer 1611b, which may be a user-facing surface, and/or a surface through an image is displayed. In an embodiment, the touch input device 1611 may be a conformed display device that is part of a vehicle dashboard. In an embodiment, the input surface 1601 may receive an external force from a touch input in various directions. The direction may be measured relative to a mechanically grounded layer or substrate 1620/1630. In an embodiment, the mechanically grounded layer or substrate 1620/1630 may be a mounting support structure. The direction may also be measured relative to the touch input device 1611. In such an instance, the external force may be applied at an angle, wherein the angle between the input surface 1601 and the external force may refer to the angle that is formed between a direction of the external force and a plane that is tangent to the input surface at a location thereon at which the external force is directly applied. The location may be a location at which there is direct contact between the input surface and a touch input. The external force may be applied in a direction that is perpendicular, parallel, or oblique to the grounded layer or substrate 1620/1630 or to the input surface 1601.

As illustrated in FIG. 16-18, the actuation and sensing system 1610 includes a first transfer component 1613 that extends from a first edge of the touch input device 1611 to the mechanically grounded structure 1620/1630, and includes a second transfer component 1623 that extends from a second and opposite edge of the touch input device 1622 to the mechanically grounded structure 1630. The edges may refer to, e.g., where the input surface 1601 or a rear surface of the touch input device 1611 meets a lateral surface of the touch input device 1611. In an embodiment, the lateral surface may be a surface that is not a front surface or rear surface of the touch input device. In such an embodiment, the front surface may be, e.g., an outer surface of the touch input device, such as an outer surface through which an image is displayed (if the touch input device is a display device). In an embodiment, a lateral surface may be perpendicular (or, more generally, substantially perpendicular) to the front surface and/or rear surface of the touch input device. While FIGS. 16 and 17 depict two transfer structures 1613, 1623 disposed adjacent to respective lateral surfaces $1611b_1$, $1611b_2$ of the touch input device 1611, other embodiments may have fewer or more transfer structures.

In FIGS. 16-18, the first transfer structure 1613 includes a first portion 1613d that is fixed (i.e., mechanically grounded) to a mechanically grounded structure 1620/1630 (e.g., a mechanically grounded base) at an edge of the first portion 1613d. The first portion 1613d in FIGS. 16-18 may be referred to as a first fixed portion or as a base portion of the first transfer structure 1613. The first transfer structure 1613 may further include a first set of three beams 1613a, 1613b, and 1613c that extend from an edge of the first fixed portion 1613d and that are disposed adjacent to a first lateral surface $1611b_1$ of the touch input device. In an embodiment, the three beams 1613a, 1613b, 1613c are support beams that support a weight of the touch input device 1611 at an edge (e.g., left edge) thereof. In an embodiment, the three beams 1613a, 1613b, and 1613c may be directly or indirectly attached to the first lateral surface $1611b_1$. In an embodiment, the attachment is via an adhesive (epoxy or double-sided tape) or fixture (e.g., a bolt) between the beams and the lateral surface. In an embodiment, the attachment may be direct, such that no the touch input system 1600 has no spacer layer between the beams and the lateral surfaces. Further, a first set of transducer patches 1614a, 1614b, and 1614c (e.g., MFC patches) may be disposed on the first set of beams 1613a, 1613b, and 1613c, respectively.

Similarly, as illustrated in FIGS. 16-18, the second transfer structure 1623 includes a second fixed portion 1623d that is fixed (i.e., mechanically grounded) to the mechanically grounded structure 1620/1630. The second transfer layer 1623 may further include a second set of three beams 1623a, 1623b, and 1623c that extend from an edge of the second fixed portion 1623d and that are disposed adjacent to a second lateral surface $1611b_2$ of the touch input device. The first lateral surface $1611b_1$ and the second lateral surface $1611b_2$ may be opposite lateral surfaces of the touch input device, and may also be lateral surfaces of the cover layer 1611. The three beams 1623a, 1623b, and 1623c may be support beams that support the weight of the touch input device 1611 at a second edge (e.g., right edge) thereof. The three beams 1623a, 1623b, and 1623c may be directly or indirectly attached to the second lateral surface $1620b_1$. Further, a second set of transducer patches 1624a, 1624b, and 1624c (e.g., MFC patches) may be disposed on the second set of beams 1623a, 1623b, and 1623c, respectively. In an embodiment, the first set of beams 1613a, 1613b, 1613c and the second set of beams 1623a, 1623b, and 1623c may be beam springs or leaf springs. Movement of the touch input device by an external force may cause bending of all or a subset of the beams 1613a-1613c, 1623a-1623c. In an embodiment, the first transfer structure 1613 and the second transfer structure 1623 may both have the form of a flat leaf-spring structure. In an embodiment, the first transfer structure 1613 and the second transfer structure 1623 may both form an oblique angle (an angle that is not zero or perpendicular) with the mechanically grounded structure 1620/1630.

In an embodiment, the leaf springs formed by the first transfer structure 1613 and the second transfer structure 1623 can be mounted at an oblique angle to the touch input device 1611, as depicted in FIGS. 16-18, or can be perpendicular to the touch input device 1611. The angle may be measured between the transfer structure 1613/1623 and a plane tangent to the touch input device 1611 at a location thereon that contacts the transfer structure 1613/1623.

In an embodiment, the first transfer structure 1613 and the second transfer structure 1623 may be able to output actuation movement along more than one degree of freedom. For instance, in FIGS. 16-18, the transfer structures 1613, 1623 may be able to actuate the touch input device 1611 in an in-plane direction (e.g., left to right) or in an out-of-plane direction (e.g., up and down). The in-plane direction may refer to a direction that is parallel to the mechanically grounded structure 1620/1630 or to a mounting surface, while the out-of-plane direction may refer to a direction that is perpendicular to the mechanically grounded structure 1620/1630 or to the mounting surface. To actuate the touch input device 1611 in an in-plane direction, the beams of the first transfer structure 1613 may be bent or otherwise deformed in an inward direction by the transducer patches thereon toward the touch input device 1611 (e.g., to the right), while the beams of the second transfer structure 1623 may be bent or otherwise deformed in an outward direction by the transducer patches thereon away from the touch input device 1611 (e.g., also to the right). As a result, the touch input device 1611 may be moved to the right. If the transfer structures 1613, 1623 periodically and synchronously reverse their direction of deformation, they may generate an in-plane vibration that transfers to the touch input device 1611. The vibration may periodically alternate (e.g., at a frequency of 100 Hz) between moving the touch input device 1611 to the left and moving the touch input device 1611 to the right.

In an embodiment, to actuate the touch input device 1611 in an out-of-plane direction, the beams of the first transfer structure 1613 may bent or otherwise deformed in an inward direction by the transducer patches thereon toward the touch input device 1611 (e.g., to the right), while the beams of the second transfer structure 1623 is also bent or otherwise deformed in an inward direction by the transducer patches thereon also toward the touch input device 1611 (e.g., to the left). As a result, the two transfer structures 1613, 1623 may provide a squeezing force on the touch input device 1611 that lifts the touch input device 1611 in an upward direction. If the transfer structures 1613, 1623 periodically and synchronously reverse their direction of deformation in this scenario, they may generate an out-of-plane vibration. In an embodiment, the out-of-plane displacement may be on the order of microns. The displacement may depend on the amount of applied force (e.g., 0.3 mm for a 3N force). In an embodiment, the touch input device 1611 may be sufficiently flexible such that the actuation output by the transfer structures 1613, 1623 may bend or otherwise deform the touch input device 1611 from its baseline state (a state in which no external force is applied). In an embodiment, the touch input device 1611 may be much more stiff than the beams of the transfer structure 1613, 1623, such that most of the deformation will occur in the beams of the transfer structure 1613, 1623, rather than in the touch input device 1611. In an embodiment, if the touch input device 1611 is fragile, the control unit of the touch input system 1600 may avoid this out-of-plane displacement mode, which may squeeze or otherwise place stresses on the touch input device 1611.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment.

What is claimed is:

1. A touch input system, comprising:
 a touch input device for receiving a touch input; and
 an actuation and sensing system having:
  a transfer structure disposed adjacent to a first surface of the touch input device, the transfer structure having a central portion, a first beam extending from a first edge of the central portion, and a second beam extending from a second and opposite edge of the central portion,
  a first transducer patch disposed on the first beam, and
  a second transducer patch disposed on the second beam,
 wherein the transfer structure is configured to transfer forces between the touch input device and the first transducer patch and the second transducer patch, such that movement of the touch input device by an external force exerted by the touch input causes deformation of at least one beam of the first beam and the second beam, and causes deformation of at least one transducer patch of the first transducer patch disposed on the first beam and the second transducer patch disposed on the second beam, and such that actuation output by the first transducer patch or the second transducer patch causes movement of the touch input device,
 wherein the central portion is configured to be more rigid than the first beam and the second beam, such that when the external force is applied to the touch input device, the central portion deforms less than the first beam, or deforms less than the second beam, and
 wherein each transducer patch of the first transducer patch and the second transducer patch has a layer of transducer material that is configured to act as a sensor by outputting a first electrical signal when the respective transducer patch and the respective beam are deformed by the external force, and is configured to act as an actuator by outputting movement that actuates the respective beam when a second electrical signal is applied to the transducer material of the respective transducer patch.

2. The touch input system of claim 1, wherein each beam of the first beam and the second beam is a respective resilient beam configured as a beam spring, wherein the deformation of the first beam or the second beam in response to the external force exerted by the touch input comprises bending of the first beam or the second beam, respectively, and wherein the bending of the first beam or of the second beam causes bending of the first transducer patch or the second transducer patch, respectively.

3. The touch input system of claim 2, wherein the transfer structure is a transfer layer, wherein the touch input device and the transfer layer are both flat and parallel with each other when no touch input has been received at the touch input device.

4. The touch input system of claim 3, wherein the transfer layer is disposed at a rear surface of the touch input device, wherein the rear surface is an opposite surface to an input surface of the touch input device.

5. The touch input system of claim 4, wherein:
 movement of the touch input device by the external force causes bending movement of the first beam and of the second beam, which causes bending movement of the first transducer patch and of the second transducer patch, respectively.

6. The touch input system of claim 4, further comprising:
 a spacer layer disposed between the rear surface of the touch input device and both the first beam and the second beam; and
 a rigid mounting support directly attached to the central portion to configure the central portion as a substantially fixed portion of the transfer layer relative to the rigid mounting support, wherein the rigid mounting support is configured to mount the touch input system to a mounting surface.

7. The touch input system of claim 1, wherein the transducer material includes a macrofiber composite (MFC) material disposed between two electrodes, the MFC material having a plurality of piezoceramic fibers embedded in a polymer matrix, or includes an electroactive polymer (EAP) material or an elastomer material disposed between two electrodes.

8. The touch input system of claim 1, wherein the touch input device comprises an internal capacitive sensor disposed at an input surface of the touch input device.

9. The touch input system of claim 1, wherein the central portion is configured to be a substantially stiff portion that does not deform when the first beam and the second beam are being deformed by the external force applied to the touch input device.

10. A touch input system, comprising:
a touch input device having an input surface configured to receive a touch input and a rear surface that is an opposite surface to the input surface;
an actuation and sensing system having:
a transfer layer disposed on the rear surface of the touch input device, the transfer layer having a first portion that is a central portion of the transfer layer, and having a first beam and a second beam, wherein the first beam extends from a first edge of the central portion, and the second beam extends from a second and opposite edge of the central portion,
a spacer layer disposed between the rear surface of the touch input device and each beam of the first beam and the second beam,
a first transducer patch disposed on the first beam, and a second transducer patch disposed on the second beam; and
a control unit in signal communication with the first transducer patch and the second transducer patch,
wherein the transfer layer is configured to transfer forces between the touch input device and both the first transducer patch and the second transducer patch, such that movement of the touch input device by an external force causes deformation of the first and second beams and of the first and second transducer patches, and such that actuation output by the first transducer patch or the second transducer patch causes movement of the touch input device,
wherein each transducer patch of the first transducer patch and the second transducer patch has a layer of transducer material that is configured to act as a sensor by outputting a first electrical signal when the respective transducer patch and the respective beam are deformed by the external force, and is configured to act as an actuator by outputting movement that actuates the respective beam when a second electrical signal is applied to the transducer material of the respective transducer patch,
wherein the control unit is configured:
to receive the first electrical signal from one or more transducer patches of the first transducer patch and the second transducer patch during a first period, and
to determine, based on the first electrical signal: (i) a pressure level associated with the touch input or (ii) a gesture associated with the touch input.

11. The touch input system of claim 10, wherein the touch input device is a rigid display device, and wherein, when the movement of the display device by the external force is substantially perpendicular to the input surface thereof, the deformation of each beam of the first and second beams includes a bending movement, which causes a bending movement of the first transducer patch and the second transducer patch, respectively.

12. The touch input system of claim 11, further comprising:
a rigid mounting support directly attached to the central portion to configure the central portion as a substantially fixed portion of the transfer layer relative to the rigid mounting support, and wherein the touch input device is suspended on the first beam and the second beam of the transfer layer.

13. The touch input system of claim 10, wherein the control unit is further configured
to detect the movement of the touch input device by the external force based on receiving the first electrical signal,
to determine that the touch input has been received based on of detecting the movement of the touch input device by the external force,
to determine that a haptic effect is to be generated in response to determining that the touch input has been received, and
to provide via a signal generator an oscillating drive signal as the second electrical signal to one or more transducer patches of the first transducer patch and the second transducer patch during a second period to cause the haptic effect to be generated at the touch input device.

14. The touch input system of claim 10, wherein the transfer layer comprises at least four beams, which include the first beam and the second beam, and wherein the at least four beams are disposed symmetrically about the central portion of the transfer layer, and wherein the at least four beams are all rectangular in shape, and have the same length, width, and thickness, and wherein the spacer layer has a thickness in a range of 50 μm to 200 μm.

15. A touch input system, comprising:
a touch input device having an input surface configured to receive a touch input and a rear surface that is an opposite surface to the input surface;
an actuation and sensing system having:
a transfer layer disposed on the rear surface of the touch input device, the transfer layer having a first portion that is a central portion of the transfer layer, and having a first beam and a second beam, wherein the first beam extends from a first edge of the central portion, and the second beam extends from a second and opposite edge of the central portion,
a spacer layer disposed between the rear surface of the touch input device and each beam of the first beam and the second beam,
a first transducer patch disposed on the first beam, and a second transducer patch disposed on the second beam; and
a control unit in signal communication with the first transducer patch and the second transducer patch,
wherein the transfer layer is configured to transfer forces between the touch input device and both the first transducer patch and the second transducer patch, such that movement of the touch input device by an external force causes deformation of the first and second beams and of the first and second transducer patches, and such that actuation output by the first transducer patch or the second transducer patch causes movement of the touch input device,
wherein each transducer patch of the first transducer patch and the second transducer patch has a layer of transducer material that is configured to act as a sensor by outputting a first electrical signal when the respective transducer patch and the respective beam are deformed by the external force, and is configured to act as an actuator by outputting movement that actuates the respective beam when a second electrical signal is applied to the transducer material of the respective transducer patch, and wherein when the first electrical signal comprises one or more pulses, the control unit is configured to determine that the touch input is a tapping input.

* * * * *